Nov. 9, 1965 R. K. GERLACH ETAL 3,217,294

CHARACTER RECOGNITION SYSTEM

Filed July 6, 1961 7 Sheets-Sheet 1

INVENTORS:
Richard K. Gerlach
Frank R. Schmid
Edward P. Bucklin, Jr.

By Louis A. Kline
John J. Matlago
Nathan Cass
Their Attorneys

Nov. 9, 1965 R. K. GERLACH ETAL 3,217,294

CHARACTER RECOGNITION SYSTEM

Filed July 6, 1961 7 Sheets-Sheet 2

INVENTORS:
Richard K. Gerlach
Frank R. Schmid
Edward P. Bucklin, Jr.
Louis A. Kline By John J. Matlago
Nathan Cass
Their Attorneys Nov. 9, 1965 R. K. GERLACH ETAL 3,217,294

CHARACTER RECOGNITION SYSTEM

Filed July 6, 1961 7 Sheets-Sheet 3

INVENTORS:
Richard K. Gerlach
Frank R. Schmid
Edward P. Bucklin, Jr.

By Louis A. Kline
John J. Matlago
Nathan Cass
Their Attorneys

Nov. 9, 1965 R. K. GERLACH ETAL 3,217,294

CHARACTER RECOGNITION SYSTEM

Filed July 6, 1961 7 Sheets-Sheet 4

INVENTORS:
Richard K. Gerlach,
Frank R. Schmid
Edward P. Bucklin, Jr.

By Louis A. Kline
John J. Matlago
Nathan Cass
Their Attorneys

Nov. 9, 1965 R. K. GERLACH ETAL 3,217,294

CHARACTER RECOGNITION SYSTEM

Filed July 6, 1961 7 Sheets-Sheet 5

INVENTORS:
Richard K. Gerlach,
Frank R. Schmid
Edward P. Bucklin, Jr.

By Louis A. Kline
John T. Matlago
Nathan Cass
Their Attorneys

INVENTORS:
Richard K. Gerlach
Frank R. Schmid
Edward P. Bucklin, Jr.
By Louis A. Kline
John J. Matlago
Nathan Cass
Their Attorneys INVENTORS:
Richard K. Gerlach
Frank R. Schmid
Edward P. Bucklin, Jr.
By Louis A. Kline
John J. Matlago
Nathan Cass
Their Attorneys United States Patent Office 3,217,294

Patented Nov. 9, 1965

3,217,294

CHARACTER RECOGNITION SYSTEM

Richard K. Gerlach, Gardena, Frank R. Schmid, El Segundo, and Edward P. Bucklin, Jr., Hawthorne, Calif., assignors to The National Cash Register Company, Dayton, Ohio, a corporation of Maryland Filed July 6, 1961, Ser. No. 122,126

19 Claims. (Cl. 340—146.3)

This invention relates generally to character recognition systems, and more particularly to a simple, high speed character recognition system capable of accurately and reliably reading relatively poor quality printed characters, and automatically outputting the characters read in a manner determined in accordance with particular ones of the characters being read.

In recent years considerable research and development has been undertaken in the search for improved character recognition systems. The ideal, of course, is to provide a simple and reliable system which is capable of reading all forms of printing recognizable by the human eye without requiring special stylized characters, additional coding marks, high quality printing magnetized ink, or the like. Some sort of optical character reading system is thus indicated but, as far as is now known, present technology is such that no optical character reading system has yet been developed or proposed which even approaches this ideal, all known systems requiring at least some form of character stylizing and restrictive tolerances on print quality. In addition, those systems which have the greatest flexibility in stylizing are usually the most complex and operate at relatively lower speeds.

From the viewpoint of present-day business machines, it is of considerable importance to realize that not all the characteristics of an ideal system are of equal importance. In particular, on many business machines, such as cash registers, accounting machines, and the like, character stylizing is not an unreconcilable problem, since the printing equipment provided on such machines can be changed without too much difficulty to conform to a desired stylizing. The stylizing, of course, must not be so drastic that the characters become unrecognizable to the human eye.

The real problem with such business machine printing equipment, in regard to their use with an optical character reading system, is the relatively poor quality of the printing produced thereby. For example, in conventional wheel-type printing equipment employed on many business machines, not only does the weight and uniformity of print vary considerably, but also, misregistration or variation in the spatial relation of one or more characters with respect to the other, as well as slight skewing or tilting, is to be expected. In fact, the misregistration or difference in displacement between the highest and lowest character printed in a line or row may, in an extreme instance, be as great as twenty percent of the character height. Still further, ordinary stock quality paper on which characters are printed by business machine printing equipment presents an additional problem, since variations in shading as well as foreign particles in the paper stock must be reckoned with and distinguished from useful character information.

One obvious solution to the character reading problem is to provide business machines with printing equipment capable of providing high quality printing on high quality paper stock, since practically all optical character readers will operate successfully under such controlled conditions. However, this solution is clearly an impractical one in view of the great expense involved, which would very considerably increase the cost of business machines, besides making previous machines incompatible unless expensive modifications are undertaken. Also, the cost of such high quality printing equipment would be prohibitive for use on relatively inexpensive business machines, such as cash registers.

Fortunately, a very considerable step forward towards a practical solution to the above mentioned problems has already been achieved, as demonstrated by the character reading system disclosed in the copending commonly assigned patent application Ser. No. 861,469, filed December 23, 1959, now abandoned, which takes advantage of the fact that stylized characters can be readily provided on many business machines. As a result, instead of contending with the considerable circuitry and expense which would be necessary to permit reading of unstylized characters, a particularly desirable form of character stylizing is chosen, and the major effort of the system is directed towards solving other important problems, with particular emphasis on the reading of the poor quality printing provided by these business machines.

In a preferred embodiment of the system disclosed in said copending patent application, the characters in the system, as normally viewed, are each considered as divided into a plurality of vertical zones, each character being stylized so that vertical segments in upper and lower portions of the character appear in selected upper and lower portions of said vertical zones, a different combination of selected zones being chosen for each character. The characters are printed in transverse rows on a tape, for example, and two-aperture scanning means are provided for progressively scanning across two adjacent lines of an entire row of characters as the tape is moved. Since each sweep scans across an entire row of characters, instead of scanning just one character at a time, both simplicity and high speed scanning are achieved.

Continuing with the description of the character reader disclosed in the aforementioned copending patent application, the movement of the scan across a row of characters is synchronized with a timing means whose outputs define the position of the scan along the plurality of vertical zones corresponding to each character in the row. To insure correct vertical registration, a record is maintained of the number of times the presence of each character is detected during successive scans, a "read scan" being made on each character, independently of the other characters in the row, only after the character has been detected a predetermined number of times; at such a time, the vertical segments in the upper and lower portions of the character will have reached the correct vertical positioning with respect to the two scanning apertures. During the "read" scan which is then performed, only the presence or absence of vertical segments in the upper and lower portions of each vertical zone of a character is sensed for the purpose of deriving a binary representation from which the particular character can be identified. In order to provide reliable optical detection with high order resolution, a pulse corresponding to the center of each vertical segment of a character is derived by sensing the reflected light variations using a photocell provided for each aperture, then differentiating the electrical signal produced by the photocell, and finally, generating a pulse each time the differentiated photocell signal passes through zero in a negative-going direction.

From the above brief description, the important features of the system of the aforementioned copending patent application may now be summarized as follows: (1) reliable character detection is made possible by stylizing the characters in the system so that a character may be recognized merely by detecting the presence or absence of discrete vertical segments in one or more vertical zones into which each character is divided, thereby permitting the scanning means and recognition circuitry to be relatively simple, since there is no need to detect varying character shapes, areas, lengths, or other diverse portions of a character as is required in some prior art systems; (2) high resolution detection of vertical character segments is achieved, even when vertical segments are very close together, by differentiating the signal provided by each photocell and forming a discrete pulse corresponding to a vertical segment only when the differentiated photocell signal passes through zero in a negative-going direction; (3) correct registration is assured by performing a "read" scan on each character independently of the other characters in the row and only when a character is in the proper "read" position with respect to the scanning apertures; and (4) high speed operation is achieved by providing scanning means for scanning across an entire row of characters with each sweep (instead of completely scanning each character before moving on to the next character as in prior art systems) and, in addition, providing means for recording registration data or performing a "read scan," whichever may be appropriate, as each character is scanned; thus, after successive sweeps of a row of characters, all the characters in the row will have been read while in the proper read position, despite appreciable misregistration between characters.

It should now be evident that the character reading system disclosed in the aforementioned patent application readily lends itself to the reliable high speed reading of relatively poor quality printed characters. Thus, except for the requirement of character stylizing, the system achieves an important advance towards the ideal character reading system when used on machines which can accept the stylizing employed. However, this system still does not provide the complete solution. Admittedly, the system of the aforementioned copending patent application accomplishes the reading of poor quality printed characters far better than other known systems and, as a result, is quite adequate in many applications. However, the accuracy of character reading still falls short of the accuracy and reliability required in certain types of business machines, particularly where horizontal and/or vertical registration may be severe.

Also, the system disclosed in the aforementioned copending patent application has no provision for taking into account possible errors due to badly smudged, misregistered, or misaligned characters which the system cannot read correctly. The system of the aforementioned copending patent application is further limited in that it provides no versatility in the manner in which character data is outputted, and thereby restricts the uses to which such a system may be put. Still further, the means provided for synchronizing the movement of a scan across a row of characters is relatively complex and does not provide for sufficient tolerances in horizontal and vertical misregistration or character dimensions which would be desirable in certain business machine applications.

It is thus the major object of the present invention to provide significant improvements in the character reading system disclosed in the aforementioned copending application Ser. No. 861,469.

Another object of the present invention is to provide a character reading system capable of reading, with high accuracy and reliability, relatively poor quality printed characters on ordinary paper stock, even in the presence of appreciable misregistration between characters.

A further object of the present invention is to provide a character reading system in which characters are scanned in rows and improved means are provided for achieving horizontal registration as well as for identifying the position of each character in the row.

A still further object of the present invention is to provide a character reading system, in accordance with any or all of the foregoing objects, which is capable of recognizing a mis-read character or row of characters and providing an error signal in response thereto.

Yet another object of the present invention is to provide a character reading system which is capable of performing a different re-scan of a character in response to a mis-read row or character in order to obtain correct identification thereof.

A still further object of the present invention is to provide a character reading system in accordance with the preceding object in which a plurality of different re-scans are performed in response to successive indications of a reading error and, if after a predetermined plurality of such re-scans the character or row of characters cannot be recognized, an error output indication is provided.

Another object of the present invention is to provide a character reading system, in accordance with any or all of the foregoing objects, which is additionally capable of automatically outputting the characters read in any predetermined order in response to particular ones of the characters being read.

An additional object of the present invention is to provide a character reading system in accordance with any or all of the foregoing objects which is relatively simple, compact and inexpensive.

The above objects are accomplished in a typical embodiment of the present invention by means of a system generally similar to the one disclosed in the aforementioned copending patent application except that, in a typical system in accordance with the present invention, substantial improvements are achieved by the incorporation of novel means to permit more adequate control of horizontal and vertical registration problems, as well as more relaxed tolerances on character dimensions. In addition, increased reading accuracy and reliability are achieved by incorporating error detecting means in conjunction with re-scanning means to permit a reading error to be detected, and a different re-scan performed in an attempt to correctly read a character or a row of characters. If, after a predetermined plurality of re-scans, the system is unable to correctly read a character or a row of characters, the particular row of characters is conveniently marked and scanning proceeds to the next row. Also made possible in accordance with the present invention is increased versatility whereby characters can be automatically outputted in any predetermined order in response to particular ones of the characters read by the system.

It will thus be recognized from the brief description above that, in accordance with the present invention, an improved character reading system can be provided which retains the significant advantages of the system disclosed in the aforementioned copending application and, in addition, provides increased capability for reading poor quality printing and for reducing the required tolerances therefor, as well as for permitting errors to be detected and corrective action taken, while offering the further advantage of increased versatility of character read-out.

The specific nature of the present invention as well as other advantages, objects, and uses thereof will become apparent to those skilled in the art as disclosure is made in the following detailed description of a typical embodiment of the present invention illustrated in the accompanying drawings in which.

Figure 10:
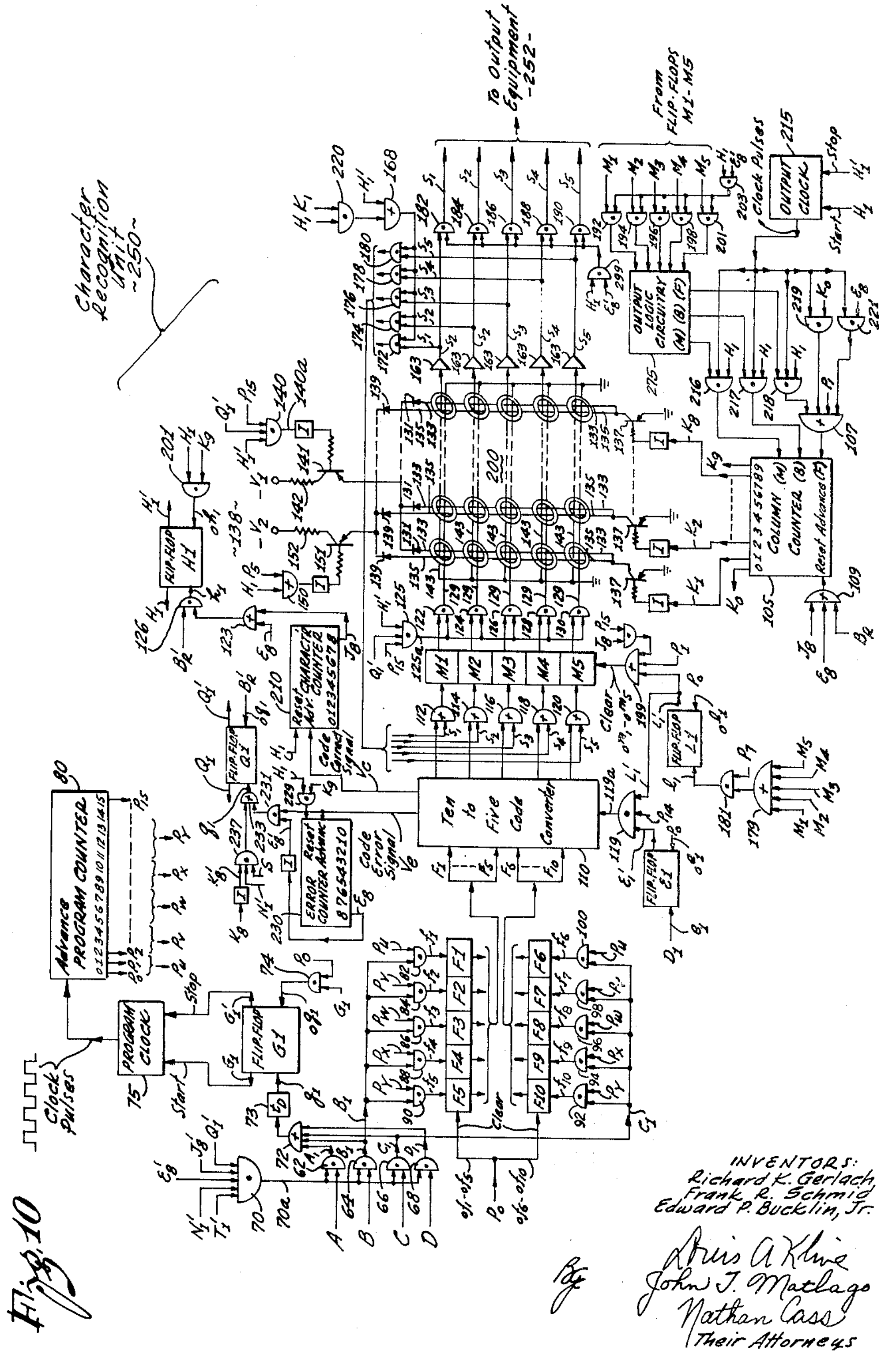
FIG. 10 is a block and circuit diagram of a detailed embodiment of the character recognition unit shown in block form in FIG. 3.
Figure 11:
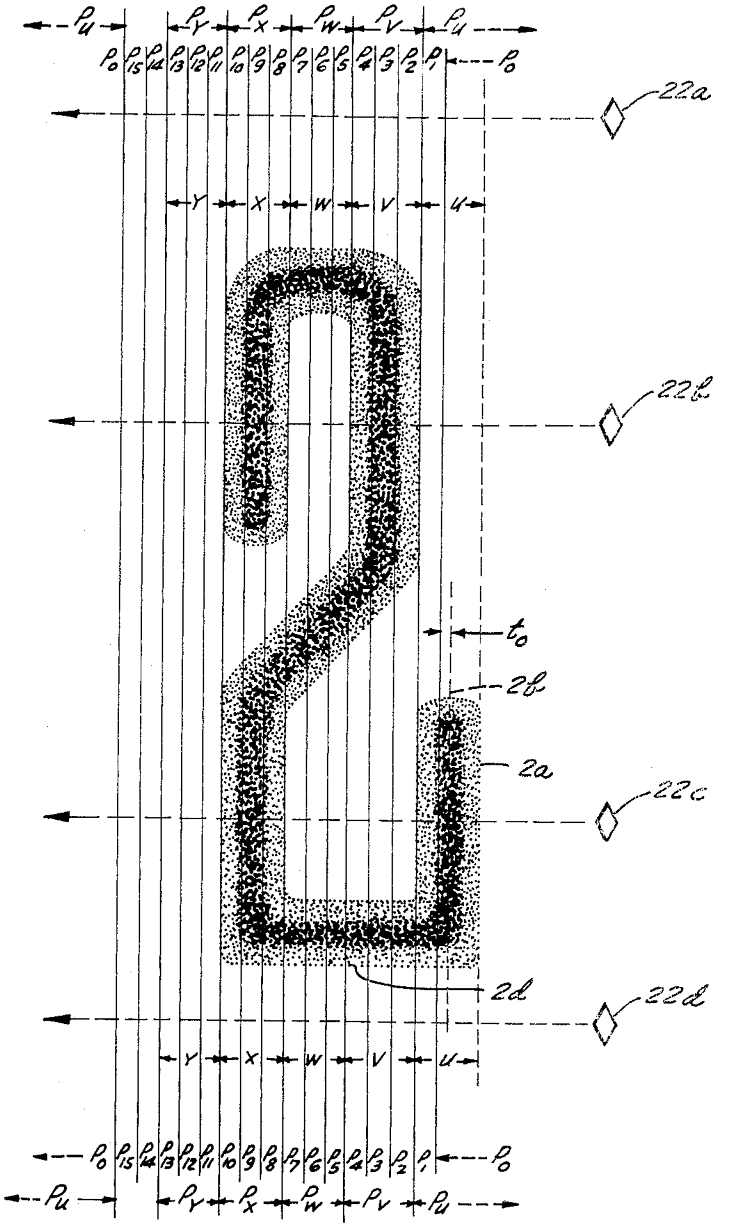
Figure 12:
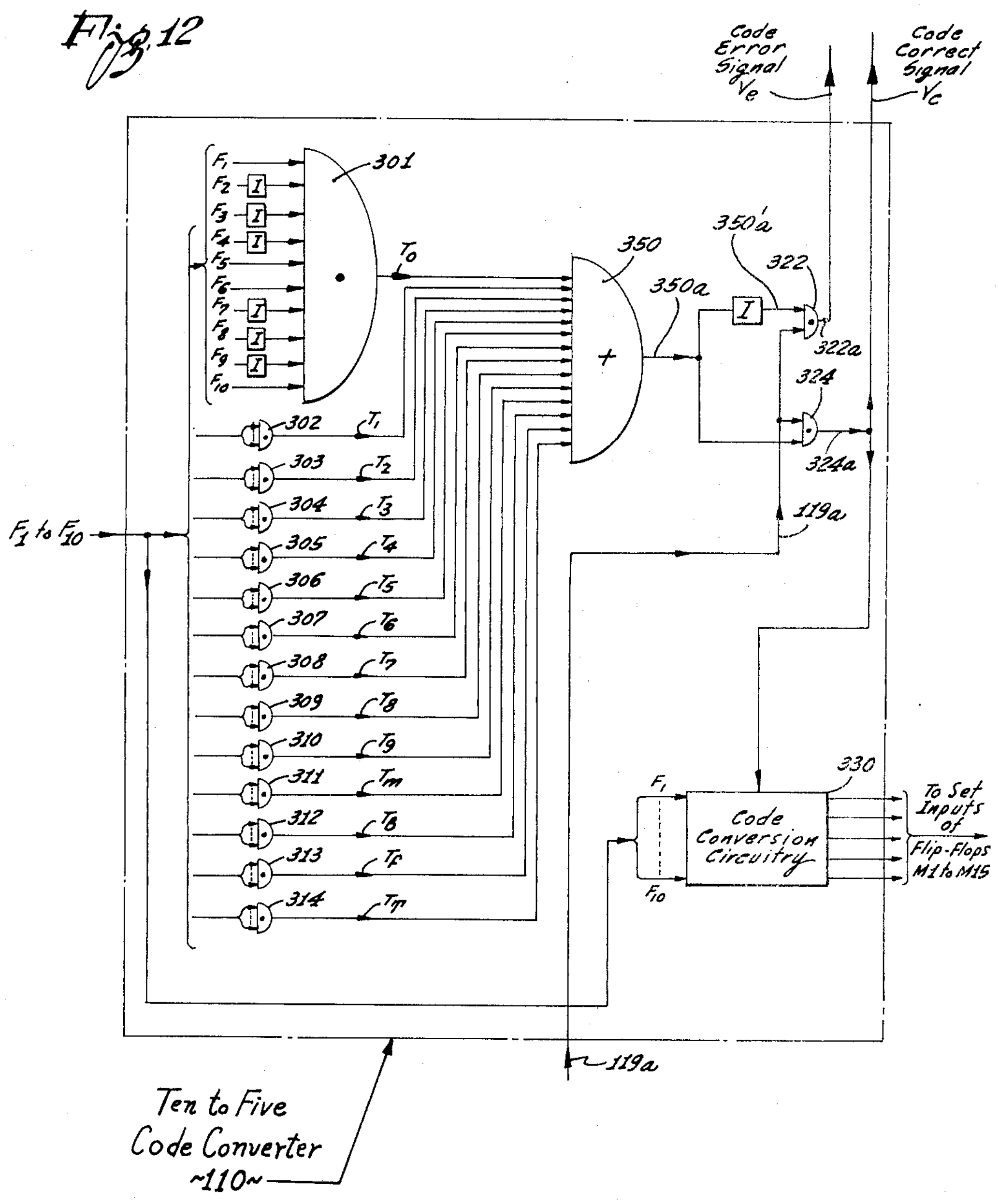

FIG. 11 shows the relationship of a typical stylized character with respect to the program counts provided by the program counter of FIG. 10, and with respect to the scanning apertures during a "read" scan; and FIG. 12 is a schematic diagram illustrating in detail the ten to five code converter of FIG. 10, showing in particular, the logical circuitry for producing the correct code signal V*c* and the error code signal V*e*.

Like numerals designate like elements throughout the figures of the drawing.

Figure 1:
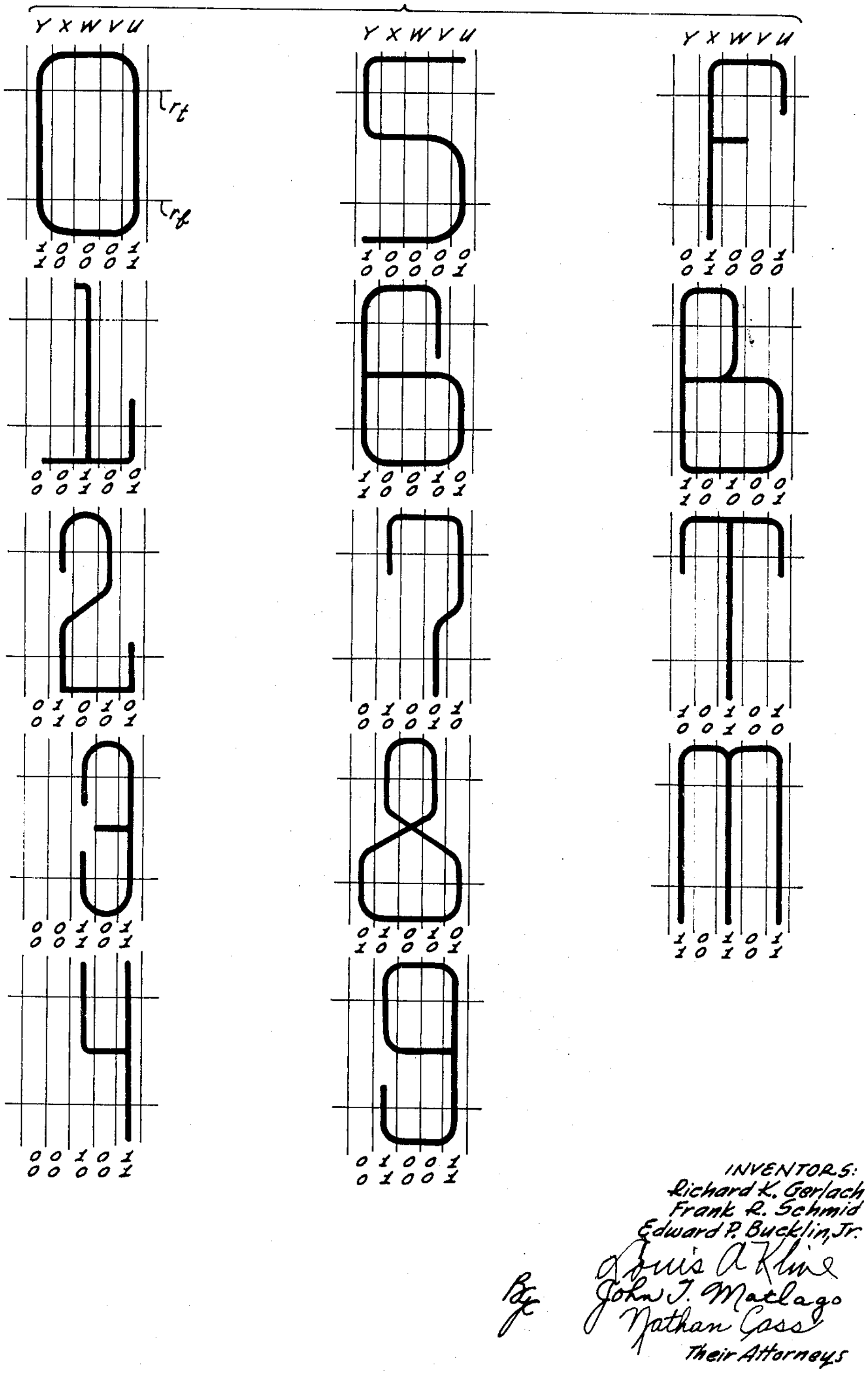
FIG. 1 shows a plurality of typical stylized characters for use in the typical embodiment of a character reading system in accordance with the invention described herein.

Referring first to FIG. 1, fourteen stylized characters are illustrated, such as may be employed in a typical character reading system in accordance with the invention. As shown in FIG. 1, ten-digit characters "0" through "9" and four alphabetical characters "F," "B," "T," and "M" are provided. Each character is divided into five vertical zones, U, V, W, X, and Y, one or more of which zones contain character information in the form of vertical segments or lines used in forming the character. It will be understood that the lines in FIG. 1 designating the zones, U, V, W, X, and Y, are provided merely for illustrative purposes and would not appear on actual printed characters.

The horizontal paths in FIG. 1 designated $r_t$ and $r_b$ passing through the top and bottom halves of each character, such as the character "0", indicate the two properly located scanning paths across zones U, V, W, X and Y for which the presence or absence of a vertical segment in each zone is detected in order to obtain character information from which the character can be identified. If the presence of a vertical character segment in a zone is designated as a binary "1," and the absence of a character segment in a zone is designated as a binary "0" then, if a character is scanned along the top and bottom paths $r_t$ and $r_b$ as indicated, a five-digit binary number will be obtained for each path as shown below each character in FIG. 1. The two five-digit binary members thus obtained may be considered as a ten-digit binary number, the stylizing of the characters in the system being such that a different ten-digit binary number is obtained for each character.

To prevent mistaking one character for another, the stylizing of the characters in the system is chosen to be such that two reading errors are required in order to mis-identify a character. For example, in scanning the letter "O" in FIG. 1, if the vertical segment in zone U of the scan along the path $r_t$ were absent because of improper printing, the five-digit binary number obtained for the top scan along path $r_t$ would be 10000 instead of 10001. An examination of the other characters in the system will reveal that there is no other character in the system having the five-digit binary number 10000 for the top scan along path $r_t$ which also has the five-digit binary number 10001 for the bottom scan along path $r_b$ and, therefore, the error can be recognized and would not cause the character to be mistaken for any other character in the system. It will also be noted in FIG. 1, that each character is stylized so that a vertical segment is provided in zone U in either or both of the paths $r_t$ or $r_b$. This is done to permit accurate control of horizontal registration, as will hereinafter become evident.

Figures 2, 3, 4:
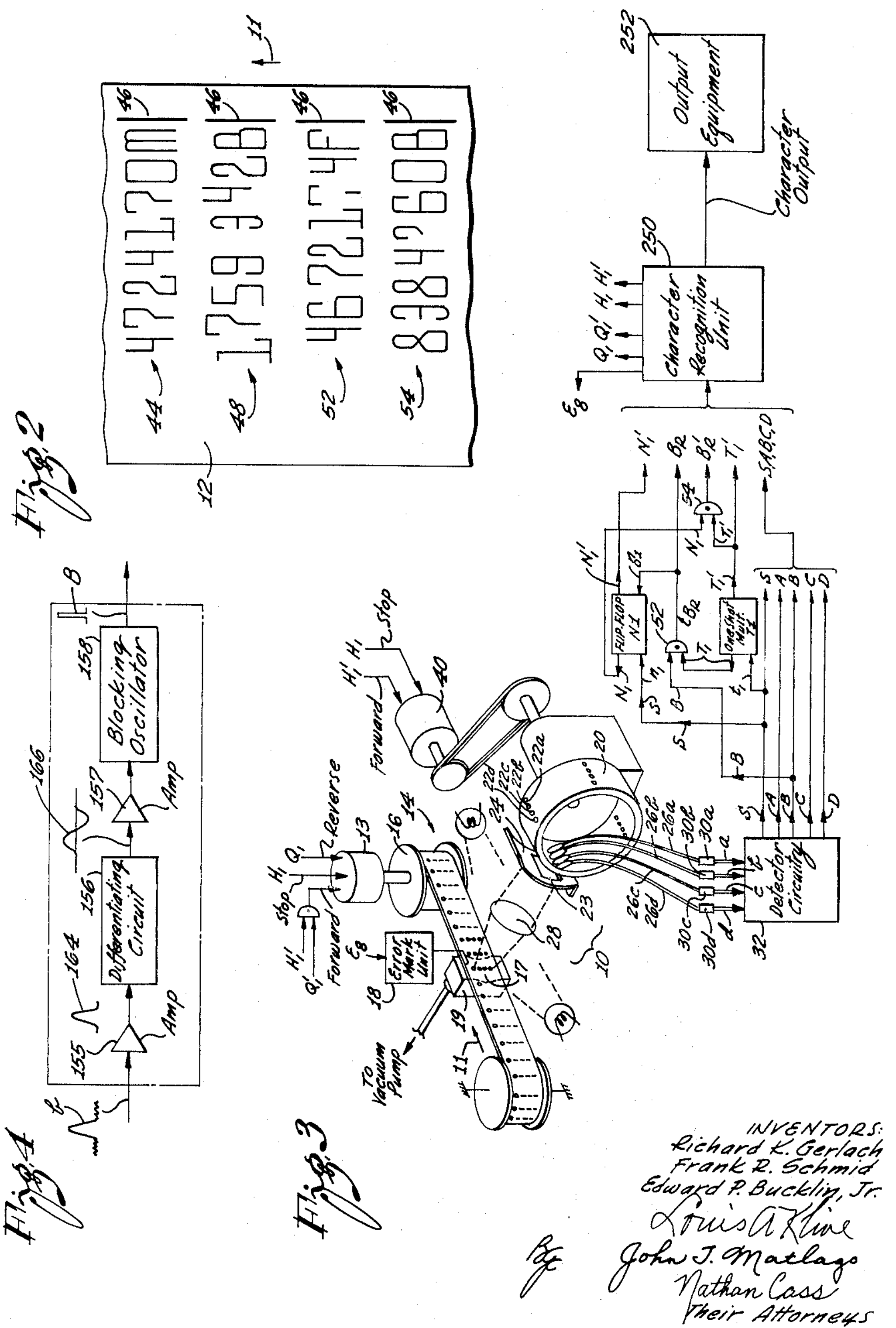
FIG. 2 illustrates a section of a typical paper tape having rows of stylized characters printed thereon.
FIG. 3 is a schematic diagram of a character reading system in accordance with the invention showing, in particular, the sensing and detecting means incorporated therein.
FIG. 4 is a block diagram of a typical portion of the detector circuitry shown in FIG. 3.

Referring now to FIG. 2, a section of tape 12 is shown having rows of stylized characters printed thereon, the stylizing being in accordance with FIG. 1. It will be noted that a vertical line or reference mark 46 is located to the right of each row of characters and extends vertically above and below the highest and lowest portions of the characters in each row. While the provision of such a reference mark 46 is not essential, it does offer certain advantages which make its use desirable as will hereinafter become evident. The first row of characters 44 shown on the tape 12 in FIG. 2 is typical of a complete row of characters in which no misregistration or printing errors in the characters is visibly noticeable. The second row 48 on the tape 12 in FIG. 2 illustrates a group of characters having both vertical and horizontal misregistration, the characters "4," "7," and "1" being misaligned vertically, and the characters "3" and "9" having excessive spacing therebetween. The last two rows of characters on the tape 12, rows 52 and 54, each illustrate a situation where a portion of one of the characters on the row is absent because of improper printing. In row 52, a portion of the character "7" is missing while, in row 54, the entire lower portion of the character "2" is missing. The manner in which these typical rows of characters in FIG. 2 are read in the system of the present invention will become evident from the typical embodiment of the invention to be described herein.

Initially, it will be helpful to briefly summarize the overall operation of the typical embodiment to be described herein, as a result of which, rows of characters such as illustrated in FIG. 2 are read. First, each row of characters is progressively scanned by successive sweeps across the row as the tape 12 is moved relatively slowly past a scanning station in the direction indicated by the arrow 11 in FIG. 2; that is, the top portions of each row of characters is scanned first. A "read" scan is then performed on each character in the row, independently of the other characters in the row, only when each character has moved to a position so that scanning is along the proper paths $r_t$ and $r_b$ shown in FIG. 1, a record being made of each character read. After all eight characters on a row have been read and recorded, scanning is temporarily halted while the characters on the row are read-out into suitable output equipment, the manner of character read-out being determined in accordance with a particular one of the characters in each row, specifically, the character nearest the reference mark 46. Employing such a procedure for read-out, the characters in row 44 in FIG. 2 would then be outputted in accordance with the character "M" in the row, the characters in row 48 and 54 would be outputted in accordance with the character "B," and the characters in row 52 would be outputted in accordance with the character "F." Another operating feature of the typical embodiment of the invention to be described herein is that, if an error is detected in a particular row, the row is re-scanned in an attempt to obtain a proper reading and, if after eight re-scans a correct reading cannot be obtained, an error signal is outputted, the row containing the error is marked to indicate where the error occurred, and scanning then proceeds to the next row.

Referring now to FIG. 3, a schematic representation is illustrated of an embodiment of an optical character reading system in accordance with the invention showing, in particular, the optical scanning and detecting means incorporated therein. As shown, a tape 12 such as illustrated in FIG. 2, is mounted for movement on a tape transport 14. A drive capstan 16 of the tape transport 14 is coupled to a synchronous motor 13 to move the tape 12 at a desired speed past the face of a forming head 19, which face defines the scanning station 17 for the tape 12.

By means of an optical lens 28, an image of the section of the tape 12 at the scanning station 17 is formed on the outer periphery of a rotating drum 20, which serves as the scanning means of an optical detector 10. The drum 20 is suitably coupled to a synchronous motor 40 to rotate the drum 20 at a desired speed. In order that the image formed on the rotating drum 20 will be in focus for the entire length of the row of characters extending across the width of the tape 12, the curved face of the forming head 19 is made to conform to the curvature of the drum periphery, and the section of the tape 12 at the scanning station 17 is maintained against the curved face of the forming head 19 by perforations leading to a vacuum chamber provided in the head 19.

The rotating drum 20 is provided with four identical groups of apertures equally spaced around the drum periphery, each group comprising four diamond-shaped apertures, such as illustrated by numerals 22*a*, 22*b*, 22*c*, and 22*d* in FIG. 3 for one such group. Interposed between the drum 20 and the lens 28 is a stationary shroud 24 surrounding a portion of the drum periphery and having a viewing slot or window 23 therein of sufficient size to permit a row of characters to be imaged on the drum periphery, the resulting image then being simultaneously scanned along four lateral paths by each group of four apertures as the group traverses the window 23.

Four beam guides 26*a*, 26*b*, 26*c*, and 26*d*, formed of Lucite rods, for example, are positioned adjacent the inner peripheral surface of the drum 20 opposite the window 23 in the shrould 24 so as to correspond to apertures 22*a*, 22*b*, 22*c*, and 22*d*, respectively. Changes in light level produced as each group of apertures 22*a*, 22*b*, 22*c*, and 22*d* scans the image on the rotating drum 20 are then transmitted through respective beam guides 26*a*, 26*b*, and 26*d* to photosensitive elements 30*a*, 30*b*, 30*c*, and 30*d*, respectively. These photosensitive elements 30*a*, 30*b*, 30*c*, and 30*d* are responsive to light variations appearing in their respective beam guides 26*a*, 26*b*, 26*c*, and 26*d* to produce respective electrical signal outputs *a*, *b*, *c*, and *d* which are fed to detector circuitry 32, as shown in FIG. 3.

Figures 5, 6, 7:
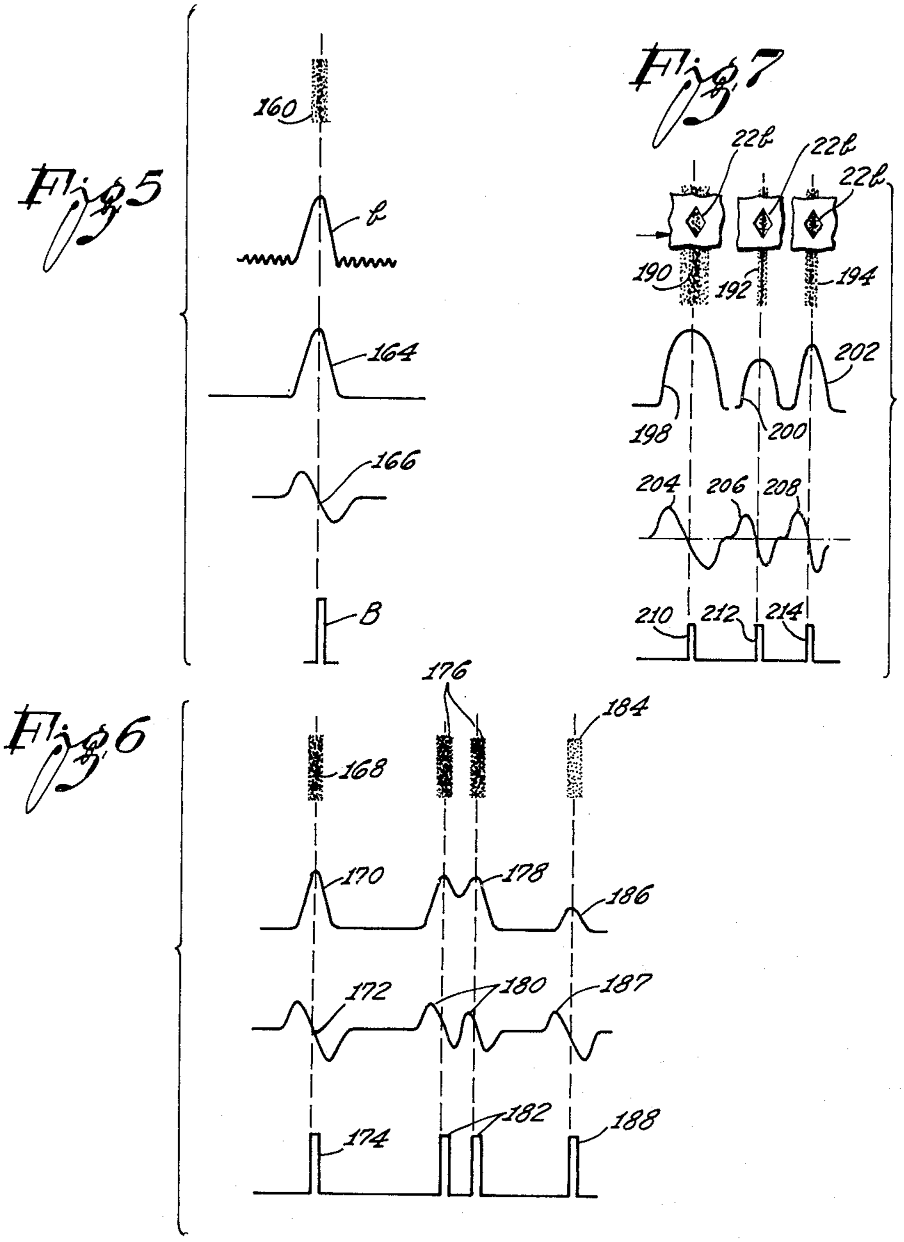
FIGS. 5 to 7 are waveforms illustrating the operation of the circuitry of FIG. 4.

The detector circuitry 32 is constructed and arranged to provide five output signals A, B, C, D, and S in response to the four input signals *a*, *b*, *c*, and *d* applied thereto. The signals A, B, C, and D consist of pulses of predetermined magnitude and duration derived directly from input signals *a*, *b*, *c*, and *d*, respectively, except that noise is substantially removed and false signals due to foreign matter in the paper stock or other extraneous marks are ignored. Each of the pulses of the signals A, B, C, and D, thus, represent the detection of a vertical character segment by its respective apertures 22*a*, 22*b*, 22*c*, or 22*d*. Since only the presence or absence of a character segment in each zone need be detected because of the stylizing employed, the apertures 22*a*, 22*b*, 22*c*, and 22d may be made sufficiently large so that the detector circuitry 32 can more easily distinguish character segments from imperfections in the paper, or from other extraneous marks. Preferably, the apertures 22*a*, 22*b*, 22*c*, and 22*d* are of diamond-shape, as shown in FIG. 7, with a transverse dimension equal to the average width of a vertical character segment. In such case, the signals resulting from foreign matter or spurious marks on the paper will represent only a relatively small percentage of the total area viewed by an aperture while, on the other hand, the signal resulting from a vertical character segment will represent the greater percentage of the total area viewed, thereby facilitating the distinguishing of character segments from other extraneous marks.

Before continuing with the description of the embodiment of FIG. 3, reference will be made to FIGS. 4 to 7 to illustrate how the detector circuitry 32 is capable of producing output signals A, B, C, and D whose shaped pulses accurately represent the detection of vertical character segments by their respective apertures 22*a*, 22*b*, 22*c*, and 22*d*, even where vertical character segments are of varying widths and print uniformity, or are very close together.

Referring to FIG. 4 along with the waveforms of FIG. 5, it will be seen that a typical portion of the detector circuitry 32 includes an amplifier 155 which amplifies an input waveform, such as the waveform *b* obtained in response to the detection of a vertical character segment 160 (FIG. 5), and adjusts its clipping level to eliminate noise, thereby producing the resultant signal waveform 164. The signal waveform 164 is next differentiated in differentiating circuit 156 of FIG. 4 to provide the signal waveform 166. The signal 166 is then amplified in amplifier 157 and coupled to the input of a blocking oscillator 158, which are so constructed and arranged to cause the shaped output pulse B to appear at the output of the blocking oscillator 158 in response to the negative-going zero crossing of the differentiated waveform 166.

Referring now to FIG. 6, typical vertical character segments 168, 176, and 184 are illustrated along with the resulting waveforms derived therefrom. The single vertical segment 168, for example, is detected to produce a signal waveform 170, a differentiated waveform 172, and an output pulse 174. The pair of adjacent vertical segments 176, on the other hand, which are spaced relatively close together, produce the signal waveform 178 in which the signals resulting from the two character segments 176 are overlapping and not clearly defined. However, the two segments 176 are still easily recognizable in accordance with the present invention since, after differentiation, the waveform 180 is produced which provides two clearly defined negative-going zero crossings, in response to which, the blocking oscillator 156 can produce the two discrete output pulses 182.

FIG. 6 also illustrates, for purposes of comparison, the relatively lightly inked vertical character segment 184 and the waveforms 186, 187, and 188 derived therefrom. It will be noted that, although the signal waveform 186 is lower in amplitude than signal waveforms 170 and 178, differentiation thereof produces a waveform 187 having a clearly defined negative-going zero crossing in response to which the output pulse 188 is readily provided by the blocking oscillator 158.

In FIG. 7, the variations in dectection resulting from vertical character segments 190, 192, and 194 of varying widths is illustrated. These vertical character segments 190, 192, and 194 are shown as being scanned, for example, by the aperture 22*b*, the resulting waveform detected by the respective photosensitive element 30*b* for each segment being illustrated at 198, 200, and 202, respectively. Upon differentiation of these waveforms 198, 200, and 202, respective differentiated waveforms 204, 206, and 208 are produced having clearly defined negative-going zero crossings, in response to which, the discrete output pulses 210, 212, and 214, respectively may once again be readily provided by the blocking oscillator 158. It will thus be noted from FIGS. 5 to 7 that a relatively wide variation in the width as well as the inking of vertical character segments can be tolerated.

It is also of considerable importance to note from FIGS. 5 to 7 that, by deriving each output pulse (such as 210, 212, and 214 in FIG. 7 in response to the negative-going zero crossing of its differentiated detected waveform, as just described, each output pulse will occur substantially at the center line of its corresponding vertical segment regardless of its width. This most advantageous result is of great value in obtaining accurate horizontal registration, as will hereinafter become evident, and is achieved because the print of a vertical segment inherently grows lighter by equal amounts on each side of its center line; consequently, the negative-going zero of the differentiated waveform, in response to which the output pulse representing the segment is produced, necessarily occurs substantially at the center line of the vertical segment.

Having described the derivation of typical pulses which are provided by signals A, B, C, and D, the description of the FIG. 3 embodiment of the invention may now be continued. It will be noted in FIG. 3 that, in addition to the signals A, B, C, and D, detector circuitry 32 provides a fifth output signal S. This output signal S is produced by the detector circuitry 32 in response to the abrupt change in the intensity of light seen by all four of the apertures 22*a*, 22*b*, 22*c*, and 22*d* as each group of apertures leave the darkness of the shroud 24 and move into the light of the window 23. At such a time, a large amplitude signal is produced by each of the respective photosensitive elements 30*a*, 30*b*, 30*c*, and 30*d*, in response to which, a unique pulse S can be produced by the detector circuitry 32, which preferably is chosen to have the same magnitude and duration as the pulses of signals A, B, C, and D (such as illustrated at B in FIG. 5). Each pulse S, therefore, may then be conveniently used to indicate the beginning of each scan of a row of characters.

Besides the signals A, B, C, D, and S obtained at the output of the detector circuitry 32, additional signals $N_1'$, $B_R$, $B_R'$, and $T_1'$ are also required in the typical embodiment of FIG. 3. These additional signals provide information relating to the detection of the reference mark 46 (FIG. 2) at the right end of each row, and may conveniently be derived from the signal S (which is a pulse appearing at the start of each scan) and the signal B (which produces a discrete pulse each time a vertical character segment, or reference mark, is detected by the aperture 22*b*). The derivation of these additional signals $N_1'$, $B_R$, $B_R'$, and $T_1'$ as well as their significance will be better understood by reference to FIGS. 8 and 9 along with FIG. 3.

Figure 8:
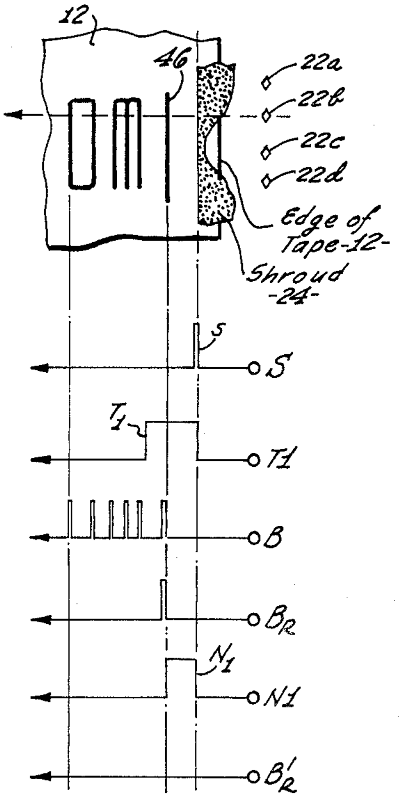
FIGS. 8 and 9 show the right end portion of a row of stylized characters on a typical paper tape and the various waveforms derived by the circuitry of FIG. 3 in response to the initiation of a scan and the intersection of a reference mark provided at the right end of each row.
Figure 9:
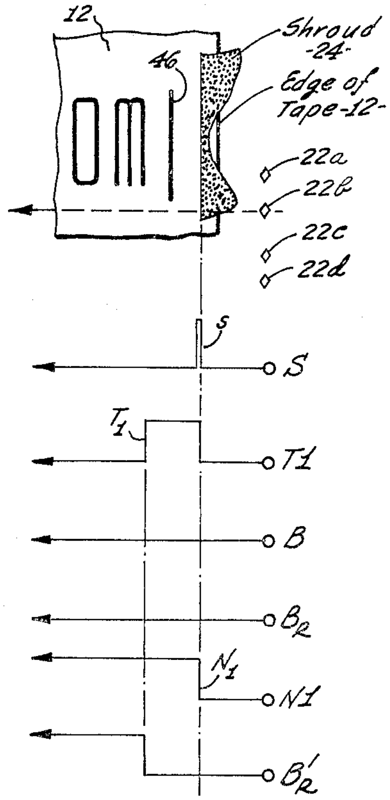

In FIGS. 8 and 9, a portion of a row of characters on the tape 12 is shown, the shroud 24 being cut away to better illustrate the apertures 22*a*, 22*b*, 22*c*, and 22*d*, which are shown in a position such that they will shortly leave the shroud 24 and enter the area of the window 23 to begin another scan of a row of characters. Also shown in FIGS. 8 and 9, below the tape 12 are waveforms which illustrate the derivation of the signals $N_1'$, $B_R$, $B_R'$, and $T_1'$, the waveforms in FIG. 8 representing the situation where the aperture 22*b* intersects the reference mark 46, and the waveforms in FIG. 9 representing the situation where the aperture 22*b* fails to intersect the reference mark 46.

Referring now to FIG. 3 along with FIGS. 8 and 9, it will be seen that the signal S is fed to the set input $t_1$ of a normally false one-shot T1 and to the set input $n_1$ of a flip-flop N1. Thus, as shown in the corresponding waveforms S, T1 and N1 in FIGS. 8 and 9, at the appearance of the pulse S (where the apertures 22*a*, 22*b*, 22*c*, and 22*d* leave the shroud 24), both the one-shot T1 and the flip-flop N1 are switched to their true state, as indicated in FIGS. 8 and 9 by their respective true outputs $T_1$ and $N_1$ becoming more positive (positive representing true and zero representing false). While only the waveforms for the true outputs $T_1$ and $N_1$ of flip-flops T1 and N1 are shown in FIGS. 8 and 9, it will be understood that the false outputs $T_1'$ and $N_1'$ will always be in a state opposite to the state of their respective true outputs $T_1$ and $N_1$. The time for which the one-shot T1 remains true before returning to its false state is chosen in accordance with the maximum time allowed for the reference mark 46 to be intercepted if it is in the path of aperture 22*b*.

The signal B from the detector circuitry 32 is fed to an "AND" gate 52 along with the true output $T_1$ of the one-shot T1. Thus, as will be understood from the corresponding waveforms T1, B, and $B_R$ in FIGS. 8 and 9, an output pulse $B_R$ is obtained from "AND" gate 52 only if a pulse is produced by signal B while $T_1$ is true; that is, if aperture 22*b* intercepts the reference mark 46 before one-shot T1 returns to its false state. In FIG. 8, aperture 22*b* intercepts the reference mark 46 so that a pulse $B_R$ is produced at the output of "AND" gate 52. However, in FIG. 9, no signal $B_R$ is produced, since aperture 22*b* does not intercept the reference mark 46. Thus, a pulse $B_R$ is produced during a scan of a row of characters only if the reference mark 46 is intercepted by aperture 22*b*. It will be noted that because the one-shot T1 remains true only for a predetermined time during which the reference mark is expected, other pulses produced by the signal B at other times will not be confused as the reference mark 46.

Having explained how the pulse $B_R$ is derived, which represents the situation where aperture 22*b* intercepts the reference mark 46 during a scan, it will now be explained how the signal $B_R'$ is derived, which represents the situation where aperture 22*b* fails to intercept the reference mark 46. Referring again to FIG. 3, it will be seen that the derived signal $B_R$ is fed to the false input $_0n_1$ of flip-flop N1, which is switched to the true state at the start of each scan by the pulse S. Thus, as shown in waveforms $B_R$ and N1 of FIGS. 8 and 9, if the reference mark is intercepted by aperture 22*b* (FIG. 8 situation), the pulse $B_R$ is produced and flip-flop N1 is switched back to its false state. The signal $B_R'$ is now derived by feeding the true output $N_1$ to an "AND" gate 54 along with the false output $T_1'$ of the one-shot T1. Then, as shown in the waveforms of FIG. 8, if the pulse $B_R$ appears, $N_1$ will be switched false before $T_1'$ becomes true and the signal $B_R'$, which is the output of "AND" gate 54, will thus remain false during the scan. However, as shown by the waveforms in FIG. 9, if the pulse $B_R$ does not appear because the aperture 22*b* does not intercept the reference mark 46, flip-flop N1 will not be switched false and will thereby be true when the one-shot T1 returns to its false state, causing $T_1'$ to become true. When this occurs, the output signal $B_R'$ of "AND" gate 54 will also become true (since both $N_1$ and $T_1'$ will be true) and, as shown by waveform $B_R'$ in FIG. 9, will remain true until $T_1'$ again becomes false when the pulse S produced at the start of the next scan switches T1 to the true state.

The signals $B_R$ and $B_R'$ derived as just described are fed, along with the false outputs $N_1'$ and $T_1'$ of flip-flop N1 and one-shot T1, respectively, and the signals A, B, C, D, and S obtained from detector circuitry 32, to a character recognition unit 250 which contains the recognition, recording and outputting means of the character reading system. The character recognition unit 250 is constructed and arranged for operation in response to these signals applied thereto to recognize each character in the row being scanned, to provide for error detection and re-scanning of a row in response to a detected error, to store the character recognition information for each character until all the characters in the row have been read, and then to output each row of characters to suitable output equipment 252 in a manner determined by the character in the row adjacent the reference mark 46.

Besides providing for character read-out, the character recognition unit 250 also provides an output signal $E_8$ whenever a row has been re-scanned eight times, in response to a detected error in the row, without being able to properly read the row. The signal $E_8$ is coupled to an error mark unit 18 disposed adjacent the scanning station 17 and constructed and arranged to mark the tape 12 adjacent the row containing the unreadable error in response to the signal $E_8$ becoming true.

The character recognition unit 250 additionally provides true and false output signals $H_1$, $H_1'$, $Q_1$, and $Q_1'$ from flip-flops H1 and Q1 in the unit 250 to control the operation of the synchronous motors 13 and 40. At this time, it will be sufficient to note that flip-flop H1 becomes true during character read-out to permit motors 13 and 40 to be halted during the read-out period, while flip-flop Q1 becomes true when an error is detected in a row, causing motor 13 to reverse and back up tape 12 for a re-scan of the row containing the error. The inertia of the motor 13 and the inherent sloppiness of the tape transport 14 (FIG. 3) results in an essentially random back-up of tape 12 which provides, with a high degree of probability, that each re-scan of a row will be randomly different. While a randomly different back-up of tape 12 is conveniently provided in this manner, it will be understood by those skilled in the art that other suitable means may also be provided for this purpose.

Referring now to FIG. 10, a detailed block and circuit diagram is illustrated of the character recognition unit 250 shown in block form in FIG. 3. Before considering the circuitry of FIG. 10, however, it will be helpful to first provide a functional description of the operations which the character recognition unit 250 is to perform in accordance with the invention. These are listed below as follows:

(1) Operation of the recognition circuitry of unit 250 is initiated when the aperture 22*b* first intercepts a reference mark which, as described in connection with FIGS. 3, 8, and 9, may be determined by the appearance of the pulse $B_R$.

(2) Each character in the row has a "read" scan performed thereon when the fourth aperture 22*d* first fails to intercept any portion of the character, thereby insuring correct vertical registration.

(3) Horizontal registration and column identification are achieved by cycling a program counter 80 through a predetermined number of counts each time any one of the four apertures 22*a*, 22*b*, 22*c*, or 22*d* intercepts the vertical segments provided in zone U for each character. The position of each character in the row is then located by a column counter 105 which counts the number of times the program counter 80 is cycled. The use of four apertures instead of only the two required for scanning the paths $r_t$ and $r_b$ (FIG. 1) assures that there will be no error in the column count since at least one aperture will always intercept the vertical segment provided in zone U of each character for a wide range of vertical misregistration.

(4) After the aperture 22*b* first intercepts the reference mark adjacent a row of characters, character information is detected for every scan as the row is progressively scanned. However, the character information detected is discarded and not recorded for outputing; that is, no "read" scan is performed on a character until the aperture 22*d* first fails to intercept any portion of the character. Character information is also discarded for a character if a "read" scan was previously performed thereon.

(5) After all eight characters in the row have been read and recorded for outputting, there is no further detecting of character information and scanning continues until the aperture 22*b* first misses the reference mark, indicating that the row has been scanned. This indication is conveniently provided by the signal $B_R'$ becoming true, as described in connection with FIG. 3. At such a time, the flip-flop H1 is switched to the "true" state halting the synchronous motors 13 and 40 (FIG. 3) and all eight characters of the row which have been recorded are now outputed in a manner determined by the character adjacent the reference mark. After all eight characters have been outputed, flip-flop H1 is switched back to the false state and scanning proceeds to the next row.

(6) In the event that in performing a "read" scan on one of the characters in the row, the character information detected is recognized as an error, or if eight columns are not counted in the row, an error signal is generated to switch flip-flop Q1 to the true state, as a result of which, synchronous motor 13 (FIG. 3) reverses to cause the tape 12 to back-up. The first time that the top of the reference mark is not intercepted by the second aperture 22*b*, which may again be recognized by the signal $B_R'$ becoming true, the flip-flop Q1 is switched back to the false state and a different re-scan is thereby performed on the row containing the error. This error detection and re-scanning is permitted to occur eight times and, if an error is again detected during the following re-scan, the signal $E_8$ becomes true to cause the error mark unit 18 in FIG. 3 to mark tape 12 adjacent the mis-read row. Scanning then progresses just as if all eight characters on the row had been correctly read and, when aperture 22*b* first misses the bottom of the reference mark to indicate that the row has been scanned (that is, $B_R'$ becomes true), flip-flop H1 is again switched to the true state. However, instead of outputing each row of characters as would be done if all eight characters were correctly read, an error code is outputed to indicate that the row could not be read, after which flip-flop H1 is switched back to the false state and scanning proceeds to the next row.

With the above functional description in mind, the construction and operation of the character recognition unit 250 shown in FIG. 10 will now be understood from the following description. Starting at the left side of FIG. 10, it will be seen that signals A, B, C, and D obtained from detector circuitry 32 in FIG. 3, are fed to one input of "AND" gates 62, 64, 66, and 68, respectively. The other input of each of these "AND" gates 62, 64, 66, and 68 is fed by the output 70*a* of another "AND" gate 70, which is in turn fed by the signals $N_1'$, $T_1'$, $E_8'$, $J_8'$, and $Q_1'$ to form the logical product thereof. It will be remembered from FIGS. 3, 8, and 9 that signals $N_1'$ and $T_1'$ fed to "AND" gate 70 are the false outputs of flip-flop N1 and the one-shot T1, respectively, the signal $N_1'$ being true only after a reference mark has been intersected by aperture 22*b*, and the signal $T_1'$, being true only after the maximum time has elapsed for which the reference mark is permitted to occur after the apertures leave the shroud 24. As mentioned previously, the signal $Q_1'$ fed to "AND" gate 70 is the false output of flip-flop Q1, while the signal $E_8'$ fed to "AND" gate 70 is the inverse of the signal $E_8$ generated when eight re-scans have failed to read a row correctly. Finally, the signal $J_8'$ fed to "AND" gate 70 is the inverse of the signal $J_8$ generated when all eight characters on a row have been read. Since the output 70*a* of "AND" gate 70 is true only when all of the above described inputs thereto are true, "AND" gates 62, 64, 66, and 68 are enabled to pass the pulses of signals A, B, C, and D only after the reference mark is detected by aperture 22*b* and only when the error flip-flop Q1 has not been switched true and the error signal $E_8$ or the final character signal $J_8$ is not present. By so restricting the feeding of signals A, B, C, and D to the remainder of the character recognition unit 250, the pulses produced by these signals A, B, C, and D during periods when they are not required are conveniently eliminated and prevented from interfering with system operation. To distinguish the outputs of "AND" gates 62, 64, 66, and 68 from the signals A, B, C, and D, they are designated as $A_1$, $B_1$, $C_1$, and $D_1$, respectively.

The manner in which the signals $A_1$, $B_1$, $C_1$, and $D_1$ are used to uniquely determine the position of the zones U, V, W, X, and Y for each character will now be explained. Still referring to FIG. 10, it will be seen that the signals $A_1$, $B_1$, $C_1$, $D_1$ are fed to an "OR" gate 72 whose output is in turn fed to a delay network 73 providing a delay $t_D$, and then to the set input $g_1$ of a flip-flop G1. Thus, in the normal scanning of a row of characters (assuming that the reference mark has been detected by aperture 22*b*), flip-flop G1 will be switched to the true state $t_D$ seconds after the first pulse produced by any one of the signals $A_1$, $B_1$, $C_1$, or $D_1$, in response to its respective aperture 22*a*, 22*b*, 22*c*, or 22*d* intersecting the vertical segment provided in zone U for each character. When flip-flop G1 is switched true, its true output $G_1$, which is fed to the "start" input of a program clock 75, also becomes true, causing clock 75 to generate clock pulses at a predetermined rate determined in accordance with system requirements. These clock pulses are fed to the "advance" input of a program counter 80 which is constructed and arranged to count, in response to each clock pulse, from an initial program count $P_0$ up to the program count $P_{15}$ and then, on the next clock pulse following, to return to the initial program count $P_0$. The repetition rate of the clock pulses provided by program clock 75 is chosen so that, when program counter 80 returns to program count $P_0$, apertures 22*a*, 22*b*, 22*c*, and 22*d* will have scanned past the first character.

Since the initial program count $P_0$ of program counter 80 is fed to the reset input $_0g_1$ of flip-flop G1 through "AND" gate 74, the other input of which is the true output $G_1$ of flip-flop G1, when the program counter 80 returns to its initial program count $P_0$ on the sixteenth clock pulse, flip-flop G1 will be switched back to its false state. When this occurs, the false output $G_1'$ of flip-flop G1, which is connected to the "stop" input of program clock 75, will become true to stop clock 75 and thereby cause program counter 80 to remain at its initial program count $P_0$ where it first started until one of the apertures 22_a_, 22_b_, 22_c_, or 22_d_ next intercepts the vertical segment in zone U of the next adjacent character in the row.

In summary, therefore, the first one of the signals $A_1$, $B_1$, $C_1$, or $D_1$ which intercepts the vertical segment provided in zone U for each character (after the reference mark has been detected by aperture 22_b_), causes flip-flop G1 to become true $t_D$ seconds later to start program clock 75 and cause program counter 80 to count through program counter $P_0$ to $P_{15}$, starting and ending with the initial program count $P_0$, at which time the apertures 22_a_, 22_b_, 22_c_, and 22_d_ will have scanned past the character. The program count $P_0$ is fed to the reset input $_0g_1$. through gate 74 along with the true output $G_1$ of flip-flop G1, instead of directly, in order to prevent program count $P_0$ in which program counter 80 rests, from interfering with flip-flop G1 being switched true when one of the apertures 22_a_, 22_b_, 22_c_, and 22_d_ intercepts the vertical segment in zone U of the next character.

The relation of each character to program counts $P_0$ to $P_{15}$ provided by program counter 80 in the manner just described, will be better understood with reference to FIG. 11, which is an enlarged view of the stylized character "2" showing the position of each program count with respect thereto. It will be remembered from the discussion of the previous paragraph that the first one of the apertures 22_a_, 22_b_, 22_c_, or 22_d_ which intercepts the certical segment provided in zone U for each character causes flip-flop G1, after a delay $t_D$, to be switched true to start program clock 75 and thereby cycle program counter 80 from its initial program count $P_0$ to program count $P_{15}$ and then back again to $P_0$. For the positioning of the apertures 22_a_, 22_b_, 22_c_, and 22_d_ with respect to the numeral "2" shown in FIG. 11, it will be seen that the aperture 22_c_ is the one which will first intercept the vertical segment 2_a_ provided in zone U for the character "2" to cause a pulse to be produced by the corresponding signal $C_1$.

As was brought out previously, each pulse produced by signals $A_1$, $B_1$, $C_1$, and $D_1$, in response to the interception of a vertical character segment by a respective aperture, occurs substantially at the center line of the vertical segment. Thus, it can accurately be presumed that the pulse produced by signal $C_1$ in response to aperture 22_c_ traversing the vertical segment 2_a_ of character "2" in FIG. 11 occurs substantially at the center line 2_b_, which is also the center of zone U. Consequently, with three program counts being provided for each of the zones V, W, X, and Y, as shown in FIG. 11, only the equivalent of one and one-half program counts is required for the remaining half of zone U in order to achieve correct horizontal registration, that is, correct positioning of the zones U, V, W, X, and Y with respect to each character. These remaining one and one-half program counts needed for zone U are obtained by choosing the delay $t_D$ provided by delay network 73, so that program count $P_1$ produced by program counter 80 in response to the first clock pulse, is present during the last one-third of zone U, as illustrated in FIG. 11. The program counts $P_2$ to $P_4$, $P_5$ to $P_7$, $P_8$ to $P_{10}$ and $P_{11}$ to $P_{13}$, will then accurately define bones V, W, X, and Y, respectively.

As was mentioned previously, each of the characters in the system is stylized to have at least one vertical segment in zone U. Thus, accurate horizontal positioning of the zones U, V, W, X, and Y for every other character in the system may be achieved in the same manner as explained with respect to the character "2" illustrated in FIG. 11. It may additionally be noted at this time that, since horizonal registration is determined in response to the detection of the center line of the vertical segment which is provided in zone U for each character (and is thus also the center line of zone U), the horizontal location of all vertical segments of a character need be controlled only with respect to the centers of their vertical segments, without regard to printing weight or segment width. This makes possible greatly reduced tolerance in character printing quality as well as in character dimensioning.

In addition to the program counts $P_1$–$P_{13}$ which are required for zones V, W. X, and Y, it will be noted in FIG. 11 that program counts $P_{14}$ and $P_{15}$ are also provided. These program counts $P_{14}$ and $P_{15}$ provide intervals for converting the ten-digit number formed from two five-digit binary numbers detected for each character during a "read" scan into a single five-digit number, and for permitting recording and/or error detection where appropriate, as will be explained in more detail further on in the description of FIG. 10. It will also be noted from FIGS. 10 and 11 that zone program counts $P_U$, $P_V$, $P_W$, $P_X$, and $P_Y$ are provided by program counter 80 for each of the zones U, V, W, X, and Y respectively corresponding thereto, each zone program count being present during the time for which its respective zone is being scanned by apertures 22_a_, 22_b_, 22_c_, and 22_d_.

An additional point to recognize at this time is that sufficient spacing between characters should, of course, be provided to permit program counter 80 to return to its initial count $P_0$ before the vertical segment in zone U of the next adjacent character is encountered by any of the apertures 22_a_, 22_b_, 22_c_, or 22_d_. During the scanning of a row, therefore, program counter 80 will be cycled in response to each character in the row and, as a result of such cycling, will provide accurate horizontal registration for each character (as described for the character "2" in FIG. 11), regardless of the horizontal spacing between characters, as long as the spacing provided is greater than the minimum required to permit program counter 80 to return to its initial count $P_0$ before the next character is intercepted. Thus, horizontal misregistration, such as illustrated between characters "3" and "9" of row 48 in FIG. 2, can readily be handled without error. It will be noted, on the other hand, that such horizontal misregistration could interfere with the operation of the system disclosed in the aforementioned patent application, since correct horizontal registration is not independently obtained for each character.

Returning now to FIG. 10, it will be seen that signal $B_1$, corresponding to aperture 22_b_, is fed to one input of each of a first group of five "AND" gates 82, 84, 86, 88, and 90, while signal $C_1$ corresponding to aperture 22_c_ is fed to one input of each of a second group of "AND" gates 92, 94, 96, 98, and 100. The other inputs of these two groups of "AND" gates are fed by respective ones of the program zone counts $P_U$, $P_V$, $P_W$, $P_X$, and $P_Y$, as shown, program zone count $P_U$ being fed to "AND" gates 82 and 92, program zone count $P_V$ being fed to "AND" gates 84 and 94, program zone count $P_W$ being fed to "AND" gates 86 and 96, program zone count $P_X$ being fed to "AND" gates 88 and 98, and program zone count $P_Y$ being fed to gates 90 and 100.

The outputs of "AND" gates 82, 84, 86, 88, and 90 are fed to respective ones of the set inputs $f_1$, $f_2$, $f_3$, $f_4$, and $f_5$ of flip-flops F1, F2, F3, F4, F5, while the outputs of "AND" gates 92, 94, 96, 98, and 100 are fed to respective ones of the set inputs $f_6$, $f_7$, $f_8$, $f_9$ and $f_{10}$ of flip-flops F6, F7, F8, F9, and F10. Consequently, in scanning a character, such as the character "2" illustrated in FIG. 11, flip-flops F1, F2, F3, F4, and F5 will be set in accordance with the presence or absence of character segments in each of the zones U, V, W, X, and Y, respectively, traversed by the aperture 22_b_, while flip-flops F6, F7, F8, F9, and F10 will be set in accordance with the presence or absence of character segments in each of the zones U, V, W, X, and Y, respectively, traversed by the aperture 22_c_. If a binary "1" indicates the presence of a vertical character segment and a binary "0" indicates the absence of a vertical character segment then, for the character "2" shown in FIG. 11, flip-flops F1, F2, F3, F4, and F5 would have the settings 01010, respectively, while F6, F7, F8, F9, and F10 would have the settings 10010, respectively. It will be noted that flip-flops F1 to F10 are all caused to be reset to their "0" settings by program count $P_O$ applied to the reset inputs ${}_0f_1$ to ${}_0f_5$ and ${}_0f_6$ to ${}_0f_{10}$ thereof, in order to prepare them for receiving character information.

As each character in a row is scanned, therefore, flip-flops F1 to F10 will be set up in accordance with the presence or absence of character segments traversed by apertures 22*b* and 22*c* in each of the zones U, V, W, X, and Y. It next becomes necessary to provide means for determining the position of each character in the row. This position information is obtained by means of a column counter 105 which is caused to advance one count, in consecutive numerical order, each time a character is scanned, by feeding the program count $P_1$ to the "advance" (F) input of column counter 105 through an "OR" gate 107. The particular advance input fed by $P_1$ through "OR" gate 107 is indicated as the (F) input, which provides for counting in consecutive numerical order. Also provided are "advance" inputs "M" and "B," the purpose of which will be described further on in this specification.

In order to insure that the column counter 105 is initially at zero at the start of a scan of a row, the reference pulse $B_R$ is fed to the "reset" input of the column counter 105 through another "OR" gate 109 (along with signals $E_8$ and $J_8$) to reset column counter 105 to its zero count $K_0$. Consequently, since program counter 80 then cycles once for each character in the row, as a result of which, program count $P_1$ advances column counter 105 one count for each character scanned, the count of the column counter 105 will correspond to the position in the row of the character being scanned. The use of the four spaced apertures 22*a*, 22*b*, 22*c*, and 22*d* assures that, for each scan in which the reference mark is intercepted by aperture 22*b*, at least one of the four apertures will intercept the vertical segment provided in zone U for each character in the row, even in the presence of appreciable misregistration between adjacent characters such as illustrated occurring between the characters "7" and "1" in row 48 of FIG. 2. As a result, program counter 80 will reliably cycle for each character in the row and the count of column counter 105 will always correctly identify the position in the row of the character being scanned.

Referring again to FIG. 11, it will be seen that after the count $P_{13}$, which is the last count of zone Y, program counter 80 counts through $P_{14}$ and $P_{15}$ before returning to its initial count $P_0$. Considering count $P_{14}$ first, if a "read" scan has been performed on the character scanned (that is, if apertures 22*b* and 22*c* have substantially traversed paths $r_t$ and $r_b$ illustrated in FIG. 1), the two five-digit binary numbers set up in flip-flops F1 to F5 and F6 to F10 during zone counts $P_U$, $P_V$, $P_W$, $P_X$, and $P_Y$ are converted by a code converter 110, during count $P_{14}$, into a single five-digit number representative of the character scanned. It will be remembered that the stylizing is chosen so that two reading errors are required in order to mis-identify a character. As a result, a single five-digit code can be derived from the two five-digit binary numbers obtained for each character which will be sufficient to represent all the characters in the system. The code converter 110 to which the true outputs $F_1$ to $F_5$ and $F_6$ to $F_{10}$ of flip-flops F1 to F5 and F6 to F10 are fed is provided for this purpose. By performing this conversion before operating further on the character information makes possible a considerable reduction in circuit complexity, since the data to be processed is reduced by one-half. Code converters, such as the ten-to-five code converter 110 illustrated in FIG. 10, may readily be provided by those skilled in the art.

As noted in the previous paragraph, code converter 110 is caused to operate to convert the character information set up in flip-flops F1 to F5 and F6 to F10, if the character is in a "read" scan position with respect to the apertures 22*b* and 22*c*, which are spaced in accordance with the spacing of $r_t$ and $r_b$ in FIG. 1. However, from the time that aperture 22*b* first detects a reference mark, apertures 22*b* and 22*c* will continuously intercept character information for each character during the progressive scanning of a row and cause flip-flops F1 to F10 to be set up in accordance therewith, even though the information detected will not be meaningful until the character is properly aligned for a "read" scan. In order to ignore the settings of flip-flops F1 to F10 until a "read" scan is performed on a character, code converter 110 is permitted to convert the settings of flip-flops F1 to F10 only in response to an energization signal 119*a*, which is caused to occur at $P_{14}$ only if a "read" scan has been performed on the character scanned. By so controlling the operation of code converter 110, if no conversion takes place at $P_{14}$, the return of program counter 80 to its initial program count $P_0$ will conveniently discard the meaningless information in flip-flops F1 to F10 by resetting these flip-flops to the "0" state in preparation for scanning the next character in the row.

Aperture 22*d* provides a most advantageous way of determining whether or not apertures 22*b* and 22*c* are properly posotioned for a "read" scan (along paths $r_t$ and $r_b$) of a character, in order to determine when code converter 110 is to be permitted to operate. This is accomplished by spacing aperture 22*d* with respect to apertures 22*b* and 22*c* so that apertures 22*b* and 22*c* will have substantially the correct alignment for a "read" scan of a character during the scan that aperture 22*d* completely misses the character for the first time. This condition is typically illustrated in FIG. 11. It has been found that by using this condition to determine when a "read" scan has been performed, significantly greater tolerances on character dimensions are possible, as compared to other approaches to vertical registration, for example, the counting of the number of times a character portion is detected, as in the aforementioned copending application. It is important to note that since aperture 22*d* is to be used for this purpose, it is necessary that the corresponding signal $D_1$ provide a pulse not only when a vertical segment is intercepted by aperture 22*d*, but also, when any portion of a character is intercepted thereby, such as the horizontal portion 2*d* of the character "2" illustrated in FIG. 11. For this reason, the detector circuitry 32 illustrated in FIGS. 3 and 4 is designed so that a pulse is produced by signal $D_1$ when any portion of a character is detected. As will be understood by those skilled in the art, suitable means for this purpose may readily be provided in detector circuitry 32, such as for example means of the type illustrated in "Handbook of Semiconductor Electronics," by L. P. Hunter, FIG. 15.39 on pages 15–43.

As mentioned previously, in order to control whether or not code converter 110 is to convert at program count $P_{14}$, code converter 110 is energized only in response to the energization signal 119*a*. This energization signal 119*a* is provided when the output of an "AND" gate 119 becomes true. Program count $P_{14}$ is fed to "AND" gate 119 along with the false output $E_1'$ of a flip-flop E1 and the false output $L_1'$ of a flip-flop L1, as shown in FIG. 10. Since signal $D_1$ corresponding to aperture 22*d* is fed to the set input $e_1$ of flip-flop E1 if, during the scan of the character, a pulse is produced by signal $D_1$ in response to aperture 22d intercepting a portion of the character, flip-flop E1 will be switched to its true state. As a result $E_1'$ will become false, inhibiting "AND" gate 119 and thereby preventing operation of code converter 110. On the other hand, if aperture 22*d* fails to intercept any portion of the character scanned, so that no pulse is produced by signal $D_1$, then flip-flop E1 will remain in its false state and its false output $E_1'$ will remain true. Thus, if $L_1'$ is also true (which is the case if this is the first time aperture 22*d* has failed to intercept any portion of the character scanned, as will hereinafter be described in detail), a "read" scan is indicated and program count $P_{14}$ will pass through "AND" gate 119 to provide the energization signal **119*a*. Code converter 110** will then convert the ten-digit binary number provided by the outputs $F_1$ to $F_{10}$ into a single five-digit binary number representative of the character scanned.

The digits of the five-digit binary number thus provided by code converter 110 at program count $P_{14}$, in response to a "read" scan, are fed through respective "OR" gates 112, 114, 116, 118, and 120 to be set up in respective ones of flip-flops M1 to M5. Then, at program count $P_{15}$, the outputs of flip-flops M1 to M5 are applied through respective "AND" gates 122, 124, 126, 128, and 130 to respective row drive lines 129 of a memory core array 200. Program count $P_{15}$ effectively opens "AND" gates 122, 124, 126, 128, and 130, since "AND" gate 125, whose output **125*a* feeds the other input of each of "AND" gates 122, 124, 126, 128, and 130, is in turn fed by program count $P_{15}$ and the false outputs $Q_1'$ and $H_1'$ of flip-flops Q1 and H1, which false outputs $Q_1'$ and $H_1'$ are normally true. Flip-flops M1 to M5 are constructed and arranged so that each flip-flop which is set to the "1" state will cause, at program count $P_{15}$, one-half write select current to be applied to the row drive line 129 of the row of cores of the memory core array 200 corresponding thereto, while ecah flip-flop which is set to the "0" state will apply no current to the write drive line 129** of its corresponding row of cores.

Memory core array 200 is comprised of eight columns of cores, each column having five cores. The eight columns of cores respectively correspond to the eight characters in each row on the tape 12 (FIG. 2), and the five cores in each column provide for the storage of a five-digit binary number representative of a respectively positioned character on the row after a "read" scan has been performed thereon. At program count $P_{15}$, in addition to the one-half write select current being applied to those rows of cores whose corresponding M1 to M5 flip-flops are set to the "1" state (as described in the previous paragraph), a particular column of cores in array 200, corresponding to the count of column counter 105 (which in turn corresponds to the position of the character in the row), also receives half-select write current applied thereto. If, for example, column counter 105 is at count $K_2$, the second column of cores in array will receive one-half write select current at $P_{15}$, causing those cores in the second column which also receive one-half write current from a corresponding M1 to M5 flip-flop to receive a total of full write select current to switch these cores from the "0" to the "1" state, the other cores in the second column as well as all the other cores in the array 200 receiving no greater than one-half write select current and thereby remaining essentially undisturbed.

It will thus be understood that the five-digit binary number set up in flip-flops M1 to M5 by code converter 110 during problem count $P_{14}$, in response to a "read" scan performed on the character scanned, will thereby be transferred, during program count $P_{15}$, to the column of cores in array 200 corresponding to the position of the scanned character in the row. In a similar manner, the five-digit binary number corresponding to every other character in the row, which is likewise set up in flip-flops M1 to M5 as a result of a "read" scan being performed thereon, is recorded in a respective column of cores in array 200 corresponding to the position of the character in the row.

The specific manner in which half-select write current is applied to the column of cores of memory core array 200 in accordance with the count of column counter 105 will now be explained in detail. Each of the outputs $K_0$, $K_1$, $K_2$, etc., of column counter 105, when true, is a positive signal which, when inverted by its respective inverter I and fed through a base resistor to the base of its respective normally cut off transistor 137, causes transistor 137 to turn on and thereby effectively ground, through the grounded transistor emitter, the write and read column drive lines 133 and 135 connected to the transistor collector. The write column drive line 133 passing through each column of cores is the only one that need be considered at this time, and it will be seen that the opposite end of each write column drive line 133 is fed through a respective diode 131 to the emitter of a normally cut-off write transistor 141. The collector of transistor 141 is connected to a D.-C. voltage $-V_1$ through a collector resistor 142, and the base of transistor 141 is connected through a base resistor and an inverter I to the output **140*a* of an "AND" gate 140. When program count $P_{15}$ appears, it passes through "AND" gate 140 (since $Q_1'$ and $H_1'$ also fed to "AND" gate 140 are normally true) to turn on transistor 141 and thereby cause a current to flow in the column drive line 133 whose transistor 137 has been turned on by the count of column counter 105. The value of $-V_1$ and collector resistor 142 is chosen so that the current flowing in the selected column drive line 133 is equal to one-half the write select current required to switch a core in array 200 from the "0" to the "1" state and, when added to the additional one-half write select current applied to those cores of the selected column whose M1 to M5 flip-flops are set to the "1" state, causes the settings of flip-flops M1 to M5 to be transferred, at program count $P_{15}$, to the column of cores in array 200** corresponding to the position in the row of the character scanned.

It should now be evident just how the five-digit binary number provided at the output of code converter 110 at program count $P_{14}$, in response to a "read" scan performed on the character scanned, is set up in flip-flops M1 to M5 and then, at program count $P_{15}$, recorded in a column of the memory core array 200 corresponding to the position of the character in the row. With this explanation as background, the purpose of flip-flop L1, whose false output $L_1'$ also determines whether or not the code converter 110 will operate at program count $P_{14}$, will now be understood as follows. It will be appreciated that once a particular character has a "read" scan performed thereon and an identifying five-digit binary number recorded in a respective column of cores of memory core array 200, aperture **22*d* will still fail to intercept any portion of a character as scanning progresses. Thus, the false output $E_1'$ of flip-flop E1 will remain true and, if no other provision were available, would cause code converter 110 to operate, even though apertures 22*b* and 22*c* would no longer traverse the paths $r_t$ and $r_b$ corresponding to a "read" scan. As mentioned previously, aperture 22*d* indicates a "read" scan only when it first fails to intercept a portion of the character scanned. Thus, to prevent upsetting a properly recorded five-digit binary number in memory core array 200, it is necessary to determine whether or not a "read" scan has already been performed on a particular character, in which case, a five-digit binary number is already recorded in the respective column of array 200; if so, the code converter 110 should be prevented from operating, since apertures 22*b* and 22*c* will no longer be in the correct position for a "read" scan. To accomplish this, it has been found convenient during an early program count in the cycling of program counter 80** such as $P_5$, to read out the five-digit binary number recorded in the column corresponding to the position of the character in the row.

Since column counter 105 has already been set, at program count $P_1$, to a count corresponding to the character being scanned, read-out from the five cores in the corresponding column in array 200 is conveniently accomplished by applying program count $P_5$ through "OR" gate 150 and an inverter I to turn on a normally cut off read transistor 151, whose collector is connected to a D.-C. voltage $-V_2$ through collector resistor 152, and whose emitter is connected to each read column drive line 135 through a respective diode 139. At program count $P_5$, therefore, current will flow through the read column drive line 135 whose respective transistor 137 has been turned on by column counter 105, the value of $-V_2$ and the collector resistor 152 being chosen so that the current flowing in the selected read column drive line 135 is equal to full read select current. Thus, if any of the cores in the selected column are in the "1" state, the full read select current flowing therethrough causes these cores to be switched to the "0" state, as a result of which, a pulse is induced in each row sense line 143 corresponding thereto. Each such induced pulse is then amplified by a respective sense amplifier 163 to provide signals $S_1$, $S_2$, $S_3$, $S_4$, and $S_5$ which correspond to the five-digit number read out of the five cores in the selected column, the presence of a pulse designating a binary "1" and the absence of a pulse designating a binary "0." These signals $S_1$, $S_2$, $S_3$, $S_4$, and $S_5$ are then fed through respective "AND" gates 172, 174, 176, 178, and 180 (since $H_1'$ fed through "OR" gate 168 to the other input of each of these "AND" gates is normally true) and respective "OR" gates 112, 114, 116, 118, and 120 to set up respective ones of the flip-flops M1, M2, M3, M4, and M5 in accordance therewith.

In summary, therefore, it will be understood that at program count $P_5$, the data stored in the column of cores in array 200, corresponding to the position in the row of the character being scanned, is read out of array 200 and set up in respective ones of flip-flops M1 to M5. It will be noted that program count $P_1$ is fed through "OR" gate 199 to the reset inputs $_0m_1$ to $_0m_5$ of flip-flops M1 to M5 in order to clear these flip-flops preparatory to their being set up at program count $P_5$, in accordance with the data stored in the selected column of cores in array 200.

Now referring specifically to flip-flop L1, it will be seen that, at program count $P_7$, the true outputs $M_1$, $M_2$, $M_3$, $M_4$, and $M_5$ are each fed to an "OR" gate 179, the output of which is fed to an "AND" gate 181 along with program count $P_7$, the output of "AND" gate 181 being in turn fed to the set input $l_1$ of flip-flop L1. Thus, if any of the flip-flops M1 to M5 were set in the "1" state at program count $P_5$, in response to a "1" being recorded in a respective core of the column of cores selected by column counter 105, then flip-flop $L_1$ will be switched to the true state at program count $P_7$. This occurs because, if any of the outputs $M_1$ to $M_5$ are true, "AND" gate 181 will be enabled to permit program count $P_7$ to pass therethrough and be applied to set input $l_1$ to switch flip-flop L1 to the true state, output $L_1'$ of flip-flop L1 then becoming false.

It will be understood, therefore, that if a "1" is recorded in any core of the column of cores in array 200, corresponding to the position in the row of the character being scanned, $L_1'$ will become false in the manner described in the previous paragraph. Since a "1" can be placed in a core of a column in array 200 only if a five-digit binary number corresponding to a character is recorded therein (there being no such character in the system whose five-digit binary number consists of five binary zeros), then the fact that $L_1'$ is false at $P_{14}$ will indicate that the particular character being scanned has already been read and recorded in its respective column. With $L_1'$ then false, program count $P_{14}$ is prevented from passing through "AND" gate 119 and energization signal **119*a* will not appear to energize code converter 110, even though $E_1'$ is true as a result of aperture 22*d*** failing to intercept any portion of the character scanned.

If, however, outputs $M_1$, $M_2$, $M_3$, $M_4$, and $M_5$ are all zero at program count $P_7$, indicating that the character has not been recorded in its respective column in array 200, then flip-flop L1, which is reset to the false state at program count $P_0$ will remain false and $L_1'$ will be true at program count $P_{14}$ to permit code converter 110 to be operated if, of course, $E_1'$ is also true, indicating that aperture **22*d* has failed to intercept any portion of the character scanned. Consequently, code converter 110 can operate at program count $P_{14}$ only if the two conditions of a "read" scan are both present; that is, (1) if aperture 22*d* has failed to intercept any portion of the character scanned so that $E_1'$ is true at $P_{14}$ and (2) if the character has not been already read and recorded in its respective column of array 200 so that $L_1'$ is also true at $P_{14}$. Or, stated another way, a "read" scan has occurred if this is the first time aperture 22*d*** has failed to intercept any portion of the character scanned.

Returning temporarily to a consideration of memory core array 200 once more, it will be remembered that, at program count $P_5$, the column of cores corresponding to the position in the row of the character being scanned was read out and set up in flip-flops M1 to M5. All of the cores in the selected column will thus now be in the "0" state because of the destructive read-out inherent in a magnetic core memory. Consequently, if the column of cores read out of array 200 at program count $P_5$ stored a five-digit number corresponding to a recorded character, it is necessary that this five-digit number be written back into the selected column, or it will be lost. Fortunately, this may readily be accomplished in the character recognition unit 250 of FIG. 10, since the five-digit binary number set up in flip-flops M1 to M5 at program count $P_5$ will still be present at program count $P_{15}$ because code converted 110 will not have operated. Thus, at program count $P_{15}$, the five-digit binary number represented by the settings of flip-flops M1 to M5 will automatically be returned to its respective column of cores in array 200, just as if a new five-digit number corresponding to a character was just being recorded in its respective column.

In summary, therefore, it will be understood that the settings of flip-flops M1 to M5 are always transferred at program count $P_{15}$ (unless either or both $Q_1'$ or $H_1'$ is false) to the column of cores selected by column counter 105. If the character being scanned has already been read and recorded in its respective column, then the five-digit number already recorded in the cores of the respective column is set up in flip-flops M1 to M5 at program count $P_5$ and remains undisturbed at program count $P_{14}$ when code converter 110 does not operate, whereupon, at program count $P_{15}$, the five-digit number in flip-flops M1 to M5 is again transferred back to its respective column.

If, however, no five-digit number is stored in the respective column of the character being scanned so that all "0's" are set up in flip-flops M1 to M5 at program count $P_5$, causing $L_1'$ to be true at program count $P_7$, two situations are then possible. First, if aperture **22*d* has failed to intercept any portion of the character scanned and $E_1'$ is thereby set true along with $L_1'$ to indicate a "read" scan was performed then, at program count $P_{14}$, flip-flops M1 to M5 will be set by code converter 110 to the five-digit binary number corresponding to the character scanned. At program count $P_{15}$, this five-digit binary number will then be transferred to the column of cores in array 200 corresponding to the position of the character in the row. The second situation occurs if aperture 22*d* has intercepted a portion of the character scanned so that $E_1'$ is set false even though $L_1'$ is true, thereby indicating that a "read" scan was not performed. Code converter 110 will then not operate at program count $P_{14}$ and flip-flops M1 to M5 will remain set to all "0's" so that, at program count $P_{15}$, the same "0" settings read out of the selected column of cores in array 200** are written back into the selected column, and the column will continue to indicate that no character is recorded therein.

Now that the means for reading and recording a typical character in array 200 have been explained, the manner in which outputting of a row of characters is achieved after all eight characters in the row have been read and recorded will be understood from the following further description of the character recognition unit 250. Referring again to code converter 110, it will be seen that, in addition to providing a five-digit binary output to flip-flops M1 to M5 at program count $P_{14}$ in response to a "read" scan, code converter 110 also provides a code correct signal V*c*, which is obtained in response to energization signal 119*a* of "AND" gate 119 and the outputs $F_1$ to $F_{10}$ of flip-flops F1 to F10. When present, at program count $P_{14}$, code correct signal V*c* indicates that a valid ten-digit binary number was obtained in response to the "read" scan performed on the character scanned, that is, that the combination of the outputs $F_1$ to $F_{10}$ provided by the "read" scan is a valid character combination. It will be appreciated by those skilled in the art that code correct signal V*c* can readily be provided by suitably combining signals 119*a* and $F_1$ to $F_{10}$ by means of well-known logical circuitry, such as illustrated in the typical embodiment of code converter 110 in FIG. 12.

Since code correct signal V*c* occurs only when a "read" scan has been performed on a character and a valid character combination set up in flip-flops F1 to F10, the signal V*c* may conveniently be fed to the "advance" input of a character counter 210 to permit a count to be maintained of the number of characters on the row which have had a proper "read" scan performed thereon and, thus, have been recorded in respective columns of memory core array 200. When character counter 210 reaches its eighth count, a positive (true) signal $J_8$ is produced to indicate that all eight characters on the row have been properly read and recorded and that the row is now ready for outputting. The signal $J_8$ is fed through an "OR" gate 123 to one input of an "AND" gate 126, which is in turn fed to the set input $h_1$ of flip-flop H1, the other input of "AND" gate 126 being fed by the signal $B_R'$, which is derived as explained in connection with FIG. 3.

As shown in FIG. 8, the signal $B_R'$ will not be true while aperture 22*b* continues to intercept the reference mark 46 during progressive scanning of the row. Thus, the output of "AND" gate 126 will remain false until scanning of the row progresses to a point where aperture 22*b* finally fails to intercept the reference mark, for example, as shown in FIG. 9. For the scan for which this occurs, $B_R'$ becomes true and since $J_8$ is also true, the output of "AND" gate 126 becomes true to switch flip-flop H1 to the true state. As a result, true output $H_1$ of flip-flop H1 becomes true while false output $H_1'$ becomes false, which initiates the operation of output clock 215 and, at the same time, stops both synchronous motors 13 and 40 to halt further scanning.

Also, as a result of flip-flop H1 being switched true, character counter 210 is reset to zero by true output $H_1$, read transistor 151 associated with memory core array 200 is turned on by true output $H_1$, and gates 125 and 140 are inhibited by output $H_1'$ becoming false to prevent the data in columns in memory array 200 from being disturbed by extraneous signals during outputting. Further, as a result of character counter signal $J_8$ having appeared, column counter 105 is reset to zero and "AND" gate 70 is inhibited, which in turn inhibits "AND" gates 62, 64, 66, and 68, to prevent unwanted pulses from appearing in signals $A_1$, $B_1$, $C_1$, and $D_1$ once signal $J_8$ appears. In addition, when signal $B_R'$ becomes true, flip-flop N1 (FIGS. 3 and 9) remains true, since there will be no reference mark signal $B_R$ to switch it false; thus, $N_1'$ becomes false to continue to effectively inhibit "AND" gate 70 after $H_1$ resets character counter 210 to zero. Thus, as a result of character counter 210 reaching $J_8$ and flip-flop H1 thereby being switched true, scanning is halted, possible interfering signals are eliminated and preparation is made to output the eight characters recorded in the eight columns of memory core array 200.

When output clock 215 is initiated into operation upon flip-flop H1 being switched true, clock pulses are produced by output clock 215 which are fed to one input of each of "AND" gates 216, 217, 218, 219, and 221, as shown in FIG. 10. Since column counter 105 has been reset to its zero count $K_0$ by signal $J_8$ of character counter 105, "AND" gate 219, to which $K_0$ is fed along with the clock pulses of output clock 215, will permit the clock pulses to pass therethrough to the "advance" (F) input of column counter 105 by way of "OR" gate 107. As mentioned previously, column counter 105 is constructed and arranged so that signals applied to its "advance" (F) input cause counter 105 to count consecutively. Thus, the first clock pulse from output clock 215 will pass through "AND" gate 219 and "OR" gate 107 to advance column counter 105 to count $K_1$. As a result, the respective transistor 137 of count $K_1$ will be turned on to effectively ground read column drive line 135, causing full select read current to flow therethrough, since read transistor 151 has already been turned on by $H_1$. Thus, the five-digit binary number stored in the first column of cores of array 200, which corresponds to the character in the row adjacent the reference mark 46 (FIG. 2), will be read out of the array 200 to provide respective sense amplifier output signals $S_1$, $S_2$, $S_3$, $S_4$, and $S_5$, respectively corresponding thereto. As mentioned previously, the presence of a pulse in one of the sense amplifier signals $S_1$, $S_2$, $S_3$, $S_4$, and $S_5$ indicates a binary "1" stored in the corresponding core of the selected column, while the absence of a pulse indicates a binary "0" stored therein.

The sense amplifier signals $S_1$, $S_2$, $S_3$, $S_4$, and $S_5$, representing the character in the row adjacent the reference mark, which are thus obtained as a result of the first clock pulse of output clock 215, are then fed to output equipment 252 through respective "AND" gates 182, 184, 186, 188, and 190 (which are enabled, since $H_1$ and $E_8'$ fed to "AND" gate 299 are both true). In addition to being outputted, these signals $S_1$, $S_2$, $S_3$, $S_4$, and $S_5$ are also fed through "AND" gates 172, 174, 176 178, and 180 (which are enabled, since $H_1$ and $K_1$ feeding "AND" gate 220 are both true) and then through respective "OR" gates 112, 114, 116, 118, and 120 to cause flip-flops M1 to M5 to be set up in accordance therewith.

With outputs $M_1$ to $M_5$ of flip-flops M1 to M5 thus set up in accordance with the first character in the row adjacent the reference mark, the outputs $M_1$ to $M_5$ thereof are next applied to output logic circuitry 275 through respective "AND" gates 192, 194, 196, 198, and 201 (which are enabled since $H_1$ and $E_8'$ fed to "AND" gate 203 are both true). A true output is then caused to appear at one of the three outputs (M), (B), or (F) of output logic circuitry 275, the particular one of the three outputs (M), (B), and (F) which is caused to be true being determined in accordance with the settings of flip-flops M1 to M5, which settings will represent the corresponding characters "M," "B," or "F." For example, as explained in connection with FIG. 2, if the settings of flip-flops M1 to M5 represent the character "M," indicating that the first character in the row adjacent the reference mark is an "M," as in row 44 of FIG. 2, the (M) output of output logic circuitry will become true.

All of the above occurs in response to the first clock pulse provided by output clock 215, as a result of which column counter 105 was advanced to count $K_1$. Since the outputs (M), (B), or (F) of output logic circuitry 275 are fed to respective "AND" gates 216, 217, and 218, the only one of these "AND" gates which will be enabled when $H_1$ becomes true is the one corresponding to the character adjacent the reference mark. Thus, after the first clock pulse, the following clock pulses provided by output clock 215 can pass only through the enabled "AND" gate to the correspondingly labeled "advance" input of column counter 105. For example, if output (M) of output logic circuitry 275 becomes true because the character "M" is adjacent the reference mark, as in row 44 of FIG. 2, the clock pulses following the first one will be fed only to "advance" input (M) of column counter 105.

Column counter 105 is constructed and arranged so that each of the advance inputs (M), (B), and (F) thereof causes counting from the first count $K_1$ in a different predetermined manner, all of which, however, have $K_9$ as the final count. The advance input (F), for example, causes counting in consecutive numerical order, that is, $K_1$, $K_2$, $K_3$, $K_4$, etc. The advance input (B), on the other hand, may provide for counting in the reverse order $K_1$, $K_8$, $K_7$, $K_6$, $K_5$, $K_4$, etc. to $K_9$. As a further variation, the advance input (F) may permit counting of only every other count, for example, $K_1$, $K_3$, $K_5$, $K_7$, and $K_9$. It will be noted that, since the zero countd $K_0$ of column counter 105 is fed to "AND" gate 219, after the first clock pulse of output clock 215 passes therethrough to advance column counter 105 to count $K_1$, no further clock pulses will be able to follow this route. Thus, the counting of column counter 105 will be determined only by the "advance" input (M), (B), or (F) effectively selected by output logic circuitry 275.

It will now be understood that, as column counter 105 counts in response to each clock pulse, the column of cores in array 200 corresponding to each count will be outputted to output equipment 252 in the same way as described for the column of cores corresponding to count $K_1$. However, it will be noted that "AND" gates 172, 174, 176, 178, and 180 are enabled only during count $K_1$ because of $K_1$ being fed to "AND" gate 220 along with $H_1$. Thus, flip-flops M1 to M5 will remain set to the first character in the row, and the particular output (M), (B), or (F) of output logic circuitry 275 which is selected in accordance therewith will remain true during the counting operation. It will also be noted that since $N_1'$ remains false during outputting, no pulses can appear in signals $A_1$, $B_1$, $C_1$, or $D_1$, and flip-flop G1 will thereby remain false to prevent program counter 80 from cycling and interfering with character read-out. It will be appreciated by those skilled in the art that, by permitting the read-out of the characters on each row to be determined in accordance with a particular one of the characters on the row, as just illustrated, the versatility of the system is significantly increased. In addition, a considerable reduction in outputting time is possible, particularly where only a portion of the characters on each row are required by the output equipment 252. It will be appreciated that the repetition rate of the clock pulses provided by output clock 215 will ordinarily be chosen in accordance with the operating rate of output equipment 252.

As noted previously, count $K_9$ will be the final count of column counter 105, regardless of which "advance" input is selected, and is thus conveniently used to return the system to normal scanning operation, since outputting will have then been completed. This is accomplished by feeding count $K_9$ to "AND" gate 201 along with $H_1$, the output of "AND" gate 201 being in turn fed to the reset input ${}_0h_1$ of flip-flop H1. When count $K_9$ becomes true, it passes through "AND" gate 201 (since $H_1$ is also true) to switch flip-flop H1 back to the false state in which it resided before outputting. As a result, motors 13 and 40 will be caused to rotate normally again and scanning will continue from where it was halted when signal $B_R'$ became true. Since aperture 22_b_ is thus between two adjacent rows of characters when scanning is resumed, the system will remain inactive until aperture 22_b_ intercepts the reference mark of the next row, at which time, the reference mark signal $B_R$ will reset column counter 105 back to its zero count $K_0$. Scanning of this next row and each following row then proceeds in the same manner as has been described above.

Having described the normal operation of the character recognition unit 250 of FIG. 10, the operation thereof when an error is detected will next be considered. For this purpose it will be assumed that a "read" scan has been performed in scanning a particular one of the characters in a row during program counts $P_0$ to $P_{13}$, but the settings of flip-flops F1 to F10 do not represent a valid character combination, so that an error is indicated. In such a situation, code converter 110 is constructed and arranged to remain inoperative even though signal 119_a_ is true, thereby causing flip-flops M1 to M5 to remain at their "0" settings. In addition, no code correct signal $Vc$ is provided. Instead, code converter 110 provides a code error signal $Ve$ to indicate that an error has occurred during a "read" scan. As will be appreciated by those skilled in the art, logical circuitry for combining signals $F_1$ to $F_{10}$ and signal 119_a_ to provide the error signal $Ve$ and to prevent conversion can readily be incorporated in code converter 110. Such typical circuitry is illustrated in FIG. 12 and will be described in detail further on in this specification.

The code error signal $Ve$ thus generated is fed to the "advance" input of an error counter 230 and to one input of an "AND" gate 231 along with the inverted error count signal $E_8'$, the signal $E_8$ becoming true in response to the eighth code error signal $Ve$ applied to error counter 230. Thus $E_8'$ will be true to permit each of the first eight code error signals $Ve$ to pass through "AND" gate 231 and "OR" gate 233 to the set input $q_1$ of flip-flop Q1 to switch flip-flop Q1 to the true state. When this occurs, $Q_1$ becomes true while $Q_1'$ becomes false causing a reversal in the direction of motor 13 (FIG. 3) thereby reversing the direction of movement of the tape 12; however, since flip-flop H1 is still off, motor 40 will continue to rotate normally and, thus, scanning will continue, but will now progress in the backward direction.

Motor 13 will continue its reverse rotation to cause scanning to progress backwardly until signal $B_R'$, which is applied to the reset input ${}_0q_1$ of flip-flop Q1, becomes true causing the flip-flop Q1 to switch back to its false state. As mentioned previously, the fact that signal $B_R'$ becomes true indicates that the reference mark has not been intercepted by aperture 22_b_. When flip-flop Q1 becomes true again, motor 13 will again rotate forwardly, but only after the tape 12 has been backed up to a position such that the row having the error will be re-scanned again, just as if it had never been scanned; that is, tape 12 is backed up to a point such that aperture 22_b_ will not yet have intercepted the reference mark of the row. As mentioned previously, because of the inherent sloppiness provided in the tape transport 14 and the inertia of motor 13, the re-scan can be expected to be different. Consequently, if the character was misread because a portion of the character was absent, such as illustrated by the character "7" in row 52 of FIG. 2, it is quite possible that, when a "read" scan is again indicated, during the re-scan, the position of the character "7" will be such that the portion of the vertical segment of the character "7" which is present will now be intercepted to permit the character to be properly read.

It should be noted that those characters in the row which have already been correctly read and, thus, are recorded in their respective columns of cores in array 200, are not disturbed during this error detection and, therefore, need not be re-read during the re-scan. This avoids an error which could occur if one of the previously read characters has a portion missing which would cause an error on the re-scan. It should also be noted that since $Q_1'$ is false, "AND" gates 70 and 140 to which $Q_1'$ is fed will be inhibited while motor 13 (FIG. 3) is moving tape 12 backwardly, thereby eliminating unwanted pulses in signals $A_1$, $B_1$, $C_1$, and $D_1$ and preventing program counter 80 from cycling and interfering with the error detection.

If upon re-scan, the misread character is again read improperly, or another error is detected, a second signal $Ve$ is produced by code converter 110 to advance error counter 230 to its second count and again switch flip-flop Q1 to the true state, whereupon the above described operation repeats all over again. If, after eight re-scans a row still cannot be properly read, error counter 210 will have advanced to its eight count to cause $E_8$ to be true. $E_8'$, therefore will be false, to inhibit "AND" gate 231 so as to prevent further code error signals V*e* from passing therethrough to initiate another re-scan. Error counter 230 is constructed and arranged in a conventional manner so that the advance to error count $E_8$ in response to the eighth code error signal V*e* does not occur until after flip-flop Q1 has been switched true by the same code error signal V*e*. This assures that the eighth code error signal V*e* will switch flip-flop Q1 to initiate the eighth and final re-scan before "AND" gate 231 is inhibited by $E_8'$ becoming false.

The signal $E_8'$ also inhibits "AND" gates 70, 140, and 299, while the signal $E_8$ resets column counter 105 to zero and enables "AND" gate 126 through "OR" gate 123 in the same manner as would the eighth character count $J_8$. Thus, scanning progresses forwardly just as if all eight characters in the row were properly read; that is, no further character information will be detected or recorded for the row and, when aperture 22*b* misses the reference mark, as illustrated in FIG. 9, flip-flop H1 will be switched true to halt motors 13 and 40 in readiness for outputting. However, because "AND" gate 299 is inhibited by $E_8'$ being false, "AND" gates 182, 184, 186, 188, and 190 will also be inhibited, and only binary "0's" will be outputted to output equipment 252 as column counter 105 counts consecutively, which counting occurs as a result of clock pulses from output clock 215 being fed to the "advance" input (F) of column counter 105 by way of "AND" gate 221, which is enabled by error count $E_8$ being true. Error count $E_8$ is also fed to output logic circuitry 275 in any suitable manner so as to prevent operation thereof, the outputs (M), (B), or (F) thereby remaining false to prevent clock pulses from output clock 215 from being fed to any other "advance" input of column counter 105, besides "advance" input (F). When count $K_9$ for column counter 105 is reached, $K_9$ will then be true along with H1, whereupon error counter 230 is reset to zero by the output of "AND" gate 229, flip-flop H1 is switched back to its false state by the output of "AND" gate 201, and scanning proceeds to the next row, just as occurred in normal outputting.

An example of a row which cannot be properly read is illustrated by row 54 in FIG. 2 in which the entire lower half of the character "2" is missing; such a character could not possibly be read correctly since the scan along path $r_b$ would always be 00000 for which no character exists in the system.

In addition to detecting an error when a character is misread during a "read" scan, it is desirable that another type of error also be detected. This error is one that could occur if a portion of a character is missing (such as the character "2" in row 54 of FIG. 2) or, if an extreme case of vertical misregistration is present, which might result in a character in the row being missed by all four apertures during a scan. In such a case, column counter 105 would not properly correspond to the position of each character in the row. In order to detect such an error, the inverted column count $K_8'$ is fed to "AND" gate 237 along with the false output $N_1'$ of flip-flop N1 (FIG. 3) and the pulse S produced when the four apertures 22*a*, 22*b*, 22*c*, and 22*d* leave shroud 24 and enter window 23 to begin a scan. If at least one of the apertures 22*a*, 22*b*, 22*c*, and 22*d* have properly detected each character in the row, column counter 105 will be at count $K_8$. Thus, when more or less than eight characters are detected during a scan $K_8'$ will be true when the pulse S indicating a new scan appeared. If, therefore, $N_1'$ is also true, indicating that the reference pulse was properly intercepted by aperture 22*b* during the scan of the row, so that eight characters should have been counted, then pulse S will pass through the output of "AND" gate 237 and through "OR" gate 231 to switch flip-flop Q1 true and initiate a re-scan, in which case operation proceeds just the same as if the error were a result of misreading a character, as described previously. It will be noted that since $N_1'$ is false during outputting, as a result of H1 having been switched true when $B_R'$ became true (see FIG. 9), flip-flop N1 will necessarily remain true during outputting and $N_1'$ will remain false to prevent any possible interference occurring during outputting.

Now, referring to FIG. 12, a typical embodiment of the code converter 110 of FIG. 10 is illustrated, showing in particular the logical circuitry by means of which the correct code signal V*c* and the error code signal V*e* are produced. From FIG. 12, it will be seen that signals $F_1$ to $F_{10}$ obtained from flip-flop F1 to F10 in FIG. 10 are fed to each of fourteen "AND" gates 301 to 314, each such "AND" gate forming the logical product of a ten-digit binary number representative of a respective one of the characters in the system. For example, "AND" gate 301 forms the product of the ten-digit binary number corresponding to character "0," inverters I being used to invert appropriate ones of the signals $F_1$ to $F_{10}$. It will be evident from FIG. 1 and the description of the character recognition unit 250 of FIG. 10, that character "0" is represented by $F_1$ to $F_{10}$ being set to the ten-digit binary number 1000110001, the first five binary digits respectively corresponding to a scan of zones U, V, W, X, and Y along path $r_t$ (FIG. 2), while the last five-digits respectively correspond to a scan of zones U, V, W, X and Y along path $r_b$. Thus, by inverting $F_2$, $F_3$, $F_4$, $F_7$, $F_8$, and $F_9$ before they are applied to "AND" gate 301, the output $T_0$ of "AND" gate 301 will be true only if $F_1$ to $F_{10}$ are set in accordance with the character "0." In a similar manner, inverters (not shown) are appropriately provided in particular ones of the inputs of "AND" gates 302 to 314 so that each will correspond to a respective one of the other characters in the system. As a result, each of the outputs $T_1$, $T_2$, $T_3$, $T_4$ . . . $T_T$ of "AND" gates 302, 303, 304 . . . 314 will be true only when $F_1$ to $F_{10}$ are set to the character in the system whose product is formed by "AND" gate respectively corresponding thereto, the subscripts of the "T" outputs indicating the particular character in the system whose product is formed by each respective "AND" gate.

The signals $T_O$ to $T_T$ thus derived in FIG. 12 are each fed to an "OR" gate 350, whose output 350*a* is in turn fed to an input of an "AND" gate 324 along with the signal 119*a*, which is the output of "AND" gate 119 shown in FIG. 10. Since the output 350*a* of "OR" gate 350 is true only when $F_1$ to $F_{10}$ represent a character of the system, and the signal 119*a* is true only when a "read" scan has been performed on the character scanned, the output 324*a* of "AND" gate 324 will be true only when a character has been correctly read during a "read" scan. The output 324*a* may thus conveniently serve as the code correct signal V*c*, as shown.

It will further be seen in FIG. 12 that the inverted output 350*a'* is fed to one input of "AND" gate 322, while the signal 119*a* is fed to the other input thereof. Thus, it will be understood that the output 322*a* of "AND" gate 322 will be true only if $F_1$ to $F_{10}$ does not correspond to a character in the system (in which case 350*a* is false and 350*a'* is true) and if, in addition, the signal 119*a* is true indicating that a "read" scan was performed on the character scanned so that a proper reading should have been obtained. Output 322*a* may, therefore, conveniently serve as the code error signal V*e*.

The actual conversion of the ten-digit binary representation of $F_1$ to $F_{10}$ is performed in code converter 110 by means of code conversion circuitry 330, which may be of conventional design, such as illustrated for example in Patents Nos. 2,733,860; 2,843,838; 2,905,934; and 2,912,679. In order to permit conversion of $F_1$ to $F_{10}$ only when a character has been properly read during a "read" scan, code conversion circuitry 330 is caused to operate only in response to output 324*a* of "AND" gate 324 becoming true. This is indicated in FIG. 12 by output 324*a* (which is also the code correct signal V*c*) being fed to code conversion circuitry 330 for use as an energization signal therefor.

It is to be understood that the embodiment described herein is only exemplary and that various modifications in construction and arrangement may be made therein without departing from the spirit of this invention. For example, the logical mechanization as well as the scanning and detecting means illustrated can be provided in many equivalent forms. Also, the number of characters provided on each row, the number of re-scans permitted to occur in response to successively detected errors, and the number of characters provided in the system are all subject to wide variations.

The above examples are only typical of possible variations and modifications which are possible in accordance with the invention and are not to be considered as exhaustive, it being understood that the present invention is intended to include all possible modifications and variations coming within the scope of the invention as defined by the appended claims.

What is claimed is:

1. In a character reading system, a record medium having a plurality of characters recorded thereon, scanning means for scanning said characters and producing electrical signals corresponding thereto, means for identifying a character in response to the electrical signals produced as a result of the scanning of said character by said scanning means, means for detecting when said electrical signals do not correspond to an identifiable character in the system, and means for automatically performing at least one re-scan of the character producing the unidentifiable electrical signals.

2. In a character reading system, a record medium having a plurality of characters recorded thereon, scanning means for scanning said characters and producing electrical signals corresponding thereto, recognition means for identifying a character in response to the electrical signals produced as a result of the scanning of said character by said scanning means, said recognition means also including means for detecting when said electrical signals do not correspond to an identifiable character and for producing an error signal in response thereto, and means responsive to said error signal for causing said scanning means to automatically perform at least one re-scan of the character which caused said error signal to be produced.

3. In a character reading system, a record medium having a plurality of characters recorded thereon, scanning means for scanning said characters and producing electrical signals corresponding thereto, recognition means for identifying a character in response to the electrical signals produced as a result of the scanning of said character by said scanning means, said recognition means also including means for detecting when said electrical signals do not correspond to an identifiable character and for producing an error signal in response thereto, means responsive to said error signal for causing said scanning means to automatically perform a re-scan of the character producing the unidentifiable electrical signals in response to each error signal resulting therefrom, and means for providing an error indication if after a predetermined plurality of said re-scans the character can not be identified.

4. In apparatus for optically translating an alphanumeric character from a record medium, said character being stylized to have upper and lower spaced portions, each portion having character segments in predetermined position locations, optical scanning means for scanning said character in a direction so as to traverse said segments, optical detecting means coupled to said optical scanning means for producing position modulated output signals in response to the sensing by said sensing means of the presence or absence of a segment in each position of said portions, means for differentiating said position modulated signals and forming discrete pulses, means for identifying said character in response to said discrete pulses, and means for automatically initiating a re-scan of said character by said scanning means if said discrete pulses do not represent an identifiable character.

5. In a character reading system, a record medium having a plurality of characters recorded thereon, scanning means for scanning said characters and producing electrical signals corresponding thereto, recognition means for identifying a character in response to the electrical signals produced as a result of the scanning of said character by said scanning means, storage means for recording character identification data corresponding to characters identified by said recognition means, and means coupled to said storage means for outputting the characters stored therein in a manner determined in accordance with predetermined ones of the characters scanned.

6. In a character reading system, a record medium having a plurality of stylized characters recorded in horizontal rows thereon, scanning and detecting means for progressively scanning each row of characters in a direction parallel to said rows and for producing electrical signals corresponding to the stylizing of said characters, recognition means for identifying a character in response to the electrical signals produced by said scanning and detecting means, storage means for recording character identification data corresponding to the characters identified by said recognition means as a result of scanning of a row by said scanning and detecting means, and means coupled to said storage means for outputting the characters of a row stored in said storage means in a manner determined in accordance with a particular character in said row.

7. In a character reading system, a record medium having a plurality of characters recorded in horizontal rows thereon, scanning and detecting means for progressively scanning rows of characters in a direction parallel to said rows and for producing electrical signals corresponding thereto, said scanning and detecting means including means for scanning along a plurality of spaced paths during each scan thereof, and recognition means for identifying a character in response to electrical signals detected along a plurality of said spaced paths when another of said spaced paths first fails to intercept any portion of the character during a scan thereof.

8. In apparatus for optically translating an alphanumeric character from a record medium, said character being stylized to have upper and lower spaced portions, each portion having character segments in predetermined position locations, optical scanning means for progressively scanning said character in a direction so as to traverse said segments, optical detecting means coupled to said optical scanning means for producing position modulated output signals in response to the sensing by said sensing means of the presence or absence of a segment in each position of said portions, said scanning means including means for scanning along a plurality of spaced paths during each scan, said paths being spaced perpendicularly to said rows, optical detecting means coupled to said optical scanning means for producing electrical signals in response to the interception of segments by said scanning means, and recognition means for identifying the character in response to predetermined electrical signals detected along two spaced paths of said scanning means when a third spaced path first fails to intercept any portion of the character during a scan thereof, the paths provided by said scanning means being spaced so that said two spaced paths respectively intercept said upper and lower portions in correct vertical registration when said third spaced path first fails to intercept any portion of the character during a scan thereof.

9. In a character reading system, a record medium having a plurality of sylized characters recorded in horizontal rows thereon, scanning means for progressively scanning said rows in a direction parallel thereto, said scanning means including means for scanning along a plurality of spaced paths during each scan, said paths being spaced perpendicularly to said rows, detecting means for producing electrical signals corresponding to the stylizing of said characters, recognition means for identifying a character in response to predetermined electrical signals detected along a plurality of said spaced paths when another of said spaced paths first fails to intercept any portion of the character during a scan thereof, said recognition means also including means for detecting when said predetermined electrical signals do not correspond to an identifiable character and for producing an error signal in response thereto, and means responsive to said error signal for causing said scanning means to automatically perform at least one re-scan of the row containing the character which caused said error signal to be produced.

10. In a character reading system, a record medium having a plurality of stylized characters recorded in horizontal rows thereon, scanning means for progressively scanning said rows in a direction parallel thereto, said scanning means including means for scanning along a plurality of spaced paths during each scan, said paths being spaced perpendicularly to said rows, detecting means for producing electrical signals corresponding to the stylizing of said characters, recognition means for identifying a character in response to predetermined electrical signals detected along a plurality of said spaced paths when another of said spaced paths first fails to intercept any portion of the character during a scan thereof, said recognition means also including means for detecting when said predetermined electrical signals do not correspond to an identifiable character and for producing an error signal in response thereto, means responsive to said error signal for causing said scanning means to automatically perform at least one randomly different re-scan of the row containing the character which caused said error signal to be produced, storage means for recording character identification data corresponding to characters identified by said recognition means as a result of scanning of a row by said scanning means, and means coupled to said storage means for outputting the characters of a row stored therein in a manner determined in accordance with at least one of said characters in the row, said last mentioned means also cooperating with said recognition means and said means responsive to said error signal to output an error indication if after a predetermined plurality of re-scans occurring in response to successive error signals a character in the row can not be identified.

11. In a character reading system, a record medium having a plurality of stylized characters recorded in horizontal rows thereon, each of said characters being stylized to provide a different binary number upon scanning thereof, scanning means for progressively scanning said rows in a direction parallel thereto, detecting means for producing electrical signals corresponding to the scanning of each character, means for determining correct horizontal registration for each character in the row in response to the detecting of a first portion thereof, means for determining the position of each character in the row by counting the number of characters in the row previously detected, means for determining correct vertical registration for each character in the row independently of the vertical registration of other characters in the row by detecting when each character has moved to a predetermined position with respect to said scanning means in the progressive scanning of a row, recognition means for identifying a character in response to the electrical signals produced by said detecting means when the character is in correct horizontal and vertical registration, said recognition means also including means for determining when said electrical signals do not correspond to an identifiable character and for producing an error signal in response thereto, and means responsive to said error signal for causing said scanning means to automatically perform at least one re-scan of the row containing the error.

12. In a character reading system, a record medium having a plurality of stylized characters recorded in horizontal rows thereon, each of said characters being stylized to provide a different binary number upon scanning thereof, scanning means for progressively scanning said rows in a direction parallel thereto, detecting means for producing electrical signals corresponding to the scanning of each character, means for determining correct horizontal registration for each character in the row in response to the detecting of a first portion thereof, means for determining the position of each character in the row by counting the number of characters in the row previously detected, means for determining correct vertical registration for each character in the row independently of the vertical registration of other characters in the row by detecting when each character has moved to a predetermined position with respect to said scanning means in the progressive scanning of a row, recognition means for identifying a character in response to the electrical signals produced by said detecting means when the character is in correct horizontal and vertical registration, storage means for recording each character in a row upon identification thereof by said recognition means, and means for outputing the characters from said storage means in a manner determined in accordance with predetermined ones of the characters scanned.

13. In a character reading system, a record medium having a plurality of stylized characters recorded in horizontal rows thereon, each of said characters being stylized to have upper and lower portions spaced in a substantially vertical direction, each portion having substantially vertical character segments located in predetermined ones of a plurality of horizontally adjacent zones into which each character is divided, the stylizing of each of said plurality of characters being such that the substantially vertical segments in the upper and lower portions of each character correspond to a pair of binary numbers which is different for each character, each character also being stylized so that at least one vertical segment is provided in a position corresponding to the first zone of the character intercepted during scanning thereof, scanning means for progressively scanning said rows in a direction parallel thereto, said scanning means including means for scanning along a plurality of spaced paths during each scan, said paths being spaced perpendicularly to said row, detecting means for producing electrical signals corresponding to the presence or absence of a vertical segment in each zone of the upper and lower portions of a character upon scanning thereof, means for determining correct horizontal registration for each character in response to the detection of the first vertical segment intercepted during scanning thereof, means for determining the position of each character in the row by counting the number of characters in the row previously detected, means for determining correct vertical registration for each character in the row independently of the vertical registration of other characters in the row by detecting when one of the paths provided by said scanning means first fails to intercept any portion of the character scanned, and recognition means for identifying a character in response to the electrical signals produced by said detecting means along two paths provided by said scanning means when the character is in correct registration, said two paths being spaced so as to respectively intercept the vertical segments in the upper and lower portions of each character when the character is in correct vertical registration as determined by said one of the paths provided by said scanning means first failing to intercept any portion of the character during a scan thereof.

14. The invention in accordance with claim 13, wherein an additional scanning path is provided by said scanning means spaced from said other paths so that the vertical segment provided for each character in a position corresponding to the first zone thereof will always be intercepted by at least one of said paths during a scan of a row.

15. The invention in accordance with claim 13 wherein said detecting means includes means for producing electrical waveforms in response to character portions intercepted along the paths of said scanning means, means for differentiating said waveforms, and means for producing output electrical signals in response to negative-going zeros of said waveforms.

16. The invention in accordance with claim 13, wherein a reference mark is provided on said record medium adjacent the end of each row which is to be scanned first, said reference mark extending above and below the highest and lowest portions of the characters in its respective row, and wherein said recognition means also includes means responsive to the interception of said reference mark by at least one path of said scanning means for determining the relative position of each row relative to said scanning means.

17. In a character reading system, a record medium having a plurality of stylized characters recorded in horizontal rows thereon, each of said characters being stylized to have upper and lower portions spaced in a substantially vertical direction, each portion having substantially vertical character segments located in predetermined ones of a plurality of horizontally adjacent zones into which each character is divided, the stylizing of each of said plurality of characters being such that the substantially vertical segments in the upper and lower portions of each character correspond to a pair of binary numbers which is different for each character, each character also being stylized so that at least one vertical segment is provided in a position corresponding to the first zone of the character intercepted during scanning thereof, scanning means for progressively scanning said rows in a direction parallel thereto, said scanning means including means for scanning along a plurality of spaced paths during each scan, said paths being spaced perpendicularly to said row, detecting means for producing electrical signals corresponding to the presence or absence of a vertical segment in each zone of the upper and lower portions of a character upon scanning thereof, means for determining correct horizontal registration for each character in response to the detection of the first vertical segment intercepted during scanning thereof, means for determining the position of each character in the row by counting the number of characters in the row previously detected, means for determining correct vertical registration for each character in the row independently of the vertical registration of other characters in the row by detecting when one of the paths provided by said scanning means first fails to intercept any portion of the character scanned, and recognition means for identifying a character in response to the electrical signals produced by said detecting means along two paths provided by said scanning means when the character is in correct registration, said two paths being spaced so as to respectively intercept the vertical segments in the upper and lower portions of each character when the character is in correct vertical registration as determined by said one of the paths provided by said scanning means first failing to intercept any portion of the character during a scan thereof, said recognition means also including means for determining when said electrical signals do not correspond to an identifiable character and for producing an error signal in response thereto, and means responsive to said error signal for causing said scanning means to automatically perform at least one re-scan of the row containing the error.

18. The invention in accordance with claim 17, wherein the stylizing of the characters in the system is such that at least two errors must occur in scanning in order to mis-identify a character.

19. In a character reading system, a record medium having a plurality of stylized characters recorded in horizontal rows thereon, each of said characters being stylized to have upper and lower portions spaced in a substantially vertical direction, each portion having substantially vertical character segments located in predetermined ones of a plurality of horizontally adjacent zones into which each character is divided, the stylizing of each of said plurality of characters being such that the substantially vertical segments in the upper and lower portions of each character correspond to a pair of binary numbers which is different for each character, each character also being stylized so that at least one vertical segment is provided in a position corresponding to the first zone of the character intercepted during scanning thereof, scanning means for progressively scanning said rows in a direction parallel thereto, said scanning means including means for scanning along a plurality of spaced paths during each scan, said paths being spaced perpendicularly to said row, detecting means for producing electrical signals corresponding to the presence or absence of a vertical segment in each zone of the upper and lower portions of a character upon scanning thereof, means for determining correct horizontal registration for each character in response to the detection of the first vertical segment intercepted during scanning thereof, means for determining the position of each character in the row by counting the number of characters in the row previously detected, means for determining correct vertical registration for each character in the row independently of the vertical registration of other characters in the row by detecting when one of the paths provided by said scanning means first fails to intercept any portion of the character scanned, recognition means for identifying a character in response to the electrical signals produced by said detecting means along two paths provided by said scanning means when the character is in correct registration, said two paths being spaced so as to respectively intercept the vertical segments in the upper and lower portions of each character when the character is in correct vertical registration as determined by said one of the paths provided by said scanning means first failing to intercept any portion of the character during a scan thereof, said recognition means also including means for determining when said electrical signals do not correspond to an identifiable character and for producing an error signal in response thereto, and means responsive to said error signal for causing said scanning means to automatically perform at least one randomly different re-scan of the row containing the error, storage means for recording each character in a row upon identification thereof by said recognition means, and means for outputing the characters from said storage means in a manner determined in accordance with particular ones of the characters scanned, said last mentioned means also cooperating with said recognition means and said means responsive to said error signal to output an error indication if after a predetermined plurality of re-scans occurring in response to successive error signals a character in the row cannot be identified.

References Cited by the Examiner

UNITED STATES PATENTS

| | | | |
|---|---|---|---|
| 2,931,916 | 4/60 | Sinn. | |
| 2,932,006 | 4/60 | Glauberman. | |
| 2,961,649 | 11/60 | Eldredge et al. | |
| 2,963,697 | 12/60 | Giel | 340—347 |
| 2,964,238 | 12/60 | King et al. | |
| 3,025,495 | 3/62 | Endres. | |

MALCOLM A. MORRISON, *Primary Examiner.*